US006411297B1

(12) United States Patent
Tampieri

(10) Patent No.: US 6,411,297 B1
(45) Date of Patent: Jun. 25, 2002

(54) GENERATING IMAGE DATA

(75) Inventor: Filippo Tampieri, Montreal (CA)

(73) Assignee: Discreet Logic Inc., Quebec (CA)

( * ) Notice: Subject to any disclaimer, the term of this patent is extended or adjusted under 35 U.S.C. 154(b) by 0 days.

(21) Appl. No.: 09/261,143

(22) Filed: Mar. 3, 1999

(51) Int. Cl.$^7$ ............................................... G06T 15/00
(52) U.S. Cl. ...................................................... 345/426
(58) Field of Search ................................. 345/419, 426, 345/423, 427, 428

(56) References Cited

U.S. PATENT DOCUMENTS

| | | | | |
|---|---|---|---|---|
| 4,928,250 A | | 5/1990 | Greenberg et al. | 364/518 |
| 5,175,808 A | | 12/1992 | Sayre | 395/133 |
| 5,222,205 A | * | 6/1993 | Larson et al. | 395/130 |
| 5,313,568 A | | 5/1994 | Wallace et al. | 395/126 |
| 5,488,700 A | | 1/1996 | Glassner | 395/126 |
| 5,579,455 A | | 11/1996 | Greene et al. | 395/122 |
| 5,734,385 A | | 3/1998 | Mima | 345/426 |
| 5,808,620 A | | 9/1998 | Doi et al. | 345/426 |
| 5,894,309 A | | 4/1999 | Freeman et al. | 345/426 |
| 5,909,087 A | | 6/1999 | Bryde et al. | 315/149 |
| 5,914,721 A | | 6/1999 | Lim | 345/421 |
| 5,936,633 A | | 8/1999 | Aono et al. | 345/432 |
| 6,078,332 A | | 7/2000 | Ohazama | 345/426 |
| 6,084,590 A | | 7/2000 | Robotham et al. | 345/419 |

OTHER PUBLICATIONS

J. Dorsey et al., "Interactive Design of Complex Time–Dependent Lighting," IEEE Comp. Graphics and Applications, 15(2):26–35, 1995.

J. Nimeroff, "Implementation and Analysis of an Image–Based . . . Environments," IEEE Trans. on Visalization and Comp. Graphics, 2(4):283–297, 1996.

D. Lischinski et al., "Discontinuity Meshing for Accurate Radiosity," Cornell Univ., IEEE Comp. Graphics and Applications, pp. 25–39, 1992.

D.W. George et al., "Radiosity Redistribution for Dynamic Environments," Cornell Univ., IEEE Comp. Graphics and Applications, pp. 26–34, 1990.

Y. Chrysanthou, "Fast Approximate Quantitative Visibility for Complex Scenes," IEEE Comp. Graphics Int'l Proceedings, pp. 220–227, 1998.

E. Pang et al., "An Efficient Implementation of Affine Transformation Using One–Dimensional FFT's," University of Toronto, Ontario, Canada MTS 3G4, IEEE Conf., 4:2885–2888, 1997.

* cited by examiner

*Primary Examiner*—Phu K. Nguyen
(74) *Attorney, Agent, or Firm*—Gates & Cooper LLP

(57) ABSTRACT

A multi-resolution representation of a radiosity equation for a scene is constructed. The scene comprises object elements and steps are performed to identify specialised cluster elements by associating object elements having a characterising relationship. Elements are linked and/or meshed in response to an estimate of error of light transmission between the elements. The linking includes the process of calculating a form factor and when linking a specialised cluster, the form factor is calculated with reference to the characterising relationship. The characterising relationship may be, for example, near co-planarity and in this way the overall processing and calculation requirements are reduced.

30 Claims, 19 Drawing Sheets

*Figure 5B*    $B_i A_i = E_i A_i + R_i \sum_{j=1}^{n} B_j A_j \cdot F_{ji}$

*Figure 5C*    $F_{ij} \cdot A_i = F_{ji} \cdot A_j$

*Figure 5D*    $B_i = E_i + R_i \sum_{j=1}^{n} B_j F_{ij}$

GENERATING IMAGE DATA

Field of the Invention

The present invention relates to generating image data, wherein objects are defined in three dimensional space.

BACKGROUND TO THE INVENTION

Several procedures are known for rendering images containing elements defined as three dimensional data. A known approach to generating images of photo-realistic quality is to consider reflections between all elements simultaneously. The light emission of any given element is considered as being dependent upon the sum of contributions from all other elements and a set of equations is defined that represents these interactions. The light emission values for all the elements are then determined simultaneously by solving a system of equations.

This procedure is known as radiosity simulation. The system of equations is usually extremely large, and several refinements to radiosity simulation have been established in order to make implementation of this method practical for scenes containing large numbers of elements.

A known advantage of radiosity is that once the system of equations has been solved, and light emission values determined, the light emission of elements may be considered as view-independent, resulting in a separate radiosity rendering process which is capable of rendering a view from any position. The high efficiency of radiosity rendering makes radiosity particularly suitable for demanding applications, such as generating long sequences of image data frames for film or video, or generating image data in real time.

A major refinement to radiosity simulation is the identification of clusters. Clusters are groups of objects that may be considered as being suitable for interaction as a single element with respect to other elements within a scene. For example, a chair that is distant from a wall may be considered as a single cluster, although it comprises many component objects. The distant wall may consider the chair as a single element, as far as light interactions are concerned, because local characteristics of the chair will become blurred with respect to the wall. Thus, it is known to analyse a scene in order to identify clusters based upon proximity. The efficiency of radiosity simulation is known to be related to the degree to which clusters may be identified.

It is an object of the present invention to provide an improved method for identifying clusters within radiosity simulation.

SUMMARY OF THE INVENTION

According to a first aspect of the present invention, there is provided a method of constructing a multi-resolution representation of a radiosity equation for a scene, wherein said scene comprises object elements; comprising the steps of: identifying specialised cluster elements by associating object elements having a characterising relationship; and linking and/or meshing elements in response to an estimate of error of light transmission between elements, wherein said linking includes calculating a form factor; and when linking a specialised cluster, said form factor is calculated with reference to said characterising relationship.

In a preferred embodiment, generalised cluster elements are identified by associating object elements in close proximity to each other; and when linking a cluster, a procedure for calculating said form factor is selected in response to said cluster type.

Preferably, the characterising relationship relates to light reflectance. Alternatively, the characterising relationship may be that of near co-planarity.

According to a second aspect of the present invention, there is provided a method of constructing a multi-resolution representation of a radiosity equation for a scene, wherein said scene comprises object elements; comprising the steps of: identifying specialised cluster elements by associating object elements having a characterising relationship; identifying general cluster elements by associating object elements according to proximity; and linking and/or meshing elements in response to an estimate of error of light transmission between elements; wherein said linking steps include calculating a form factor; and when linking a cluster, selecting a method of form factor calculation in response to cluster type.

BRIEF DESCRIPTION OF THE DRAWINGS

FIG. 5B summarises light energy transfer between a single receiving surface, and an arbitrary number of emitting surfaces;

FIG. 5C shows the radiosity reciprocity equation;

FIG. 5D shows the classical radiosity equation;

DETAILED DESCRIPTION OF THE PREFERRED EMBODIMENTS

Figure 1:
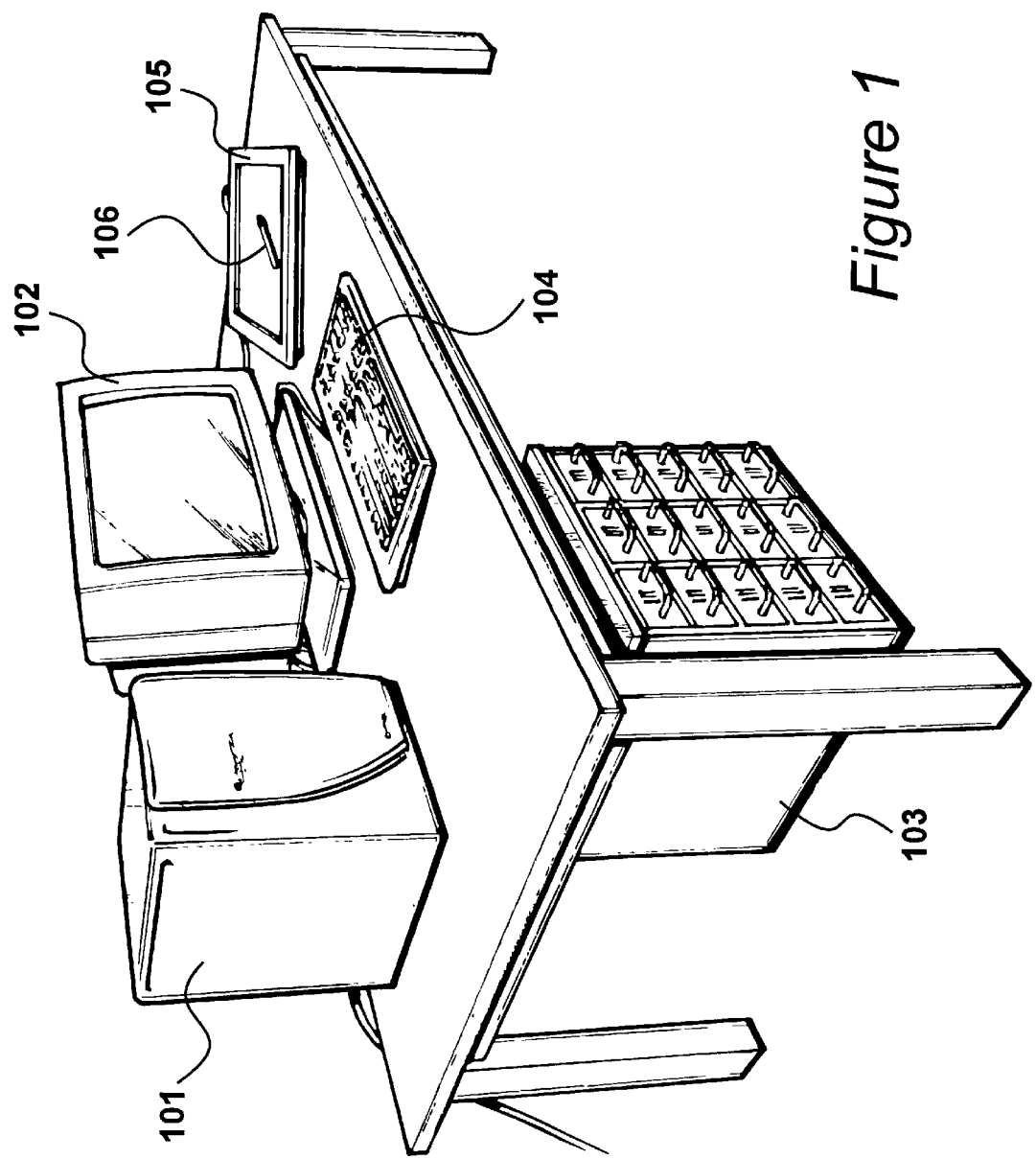
FIG. 1 shows a system for generating image data, including a monitor and a processing system.

A system for generating image data using radiosity is illustrated in FIG. 1. The radiosity process involves performing a radiosity simulation in which light emission values are calculated for all elements in the scene, irrespective of viewing position. Thereafter, this information is made available for particular viewing positions during radiosity rendering. The rendering process requires a sufficiently low level of computation to enable image frames of high definition and high photo realism to be rendered with high efficiency.

A processing system 101, such as an Octane™ produced by Silicon Graphics Inc., supplies output image signals to a video display unit 102. A user defines a scene in terms of objects in three dimensions, or by importing three-dimensional scene data from a pre-existing scene structure. The user may also determine a stationary or moving camera position from which to view the resulting rendered scene image. Rendered frames of image data, derived from three-dimensional scene data, are stored by means of a striped redundant array of inexpensive discs (RAID) 103. The system receives user commands from a keyboard 104 and a graphics tablet 105 operated by a pressure sensitive stylus 106.

Figure 2:
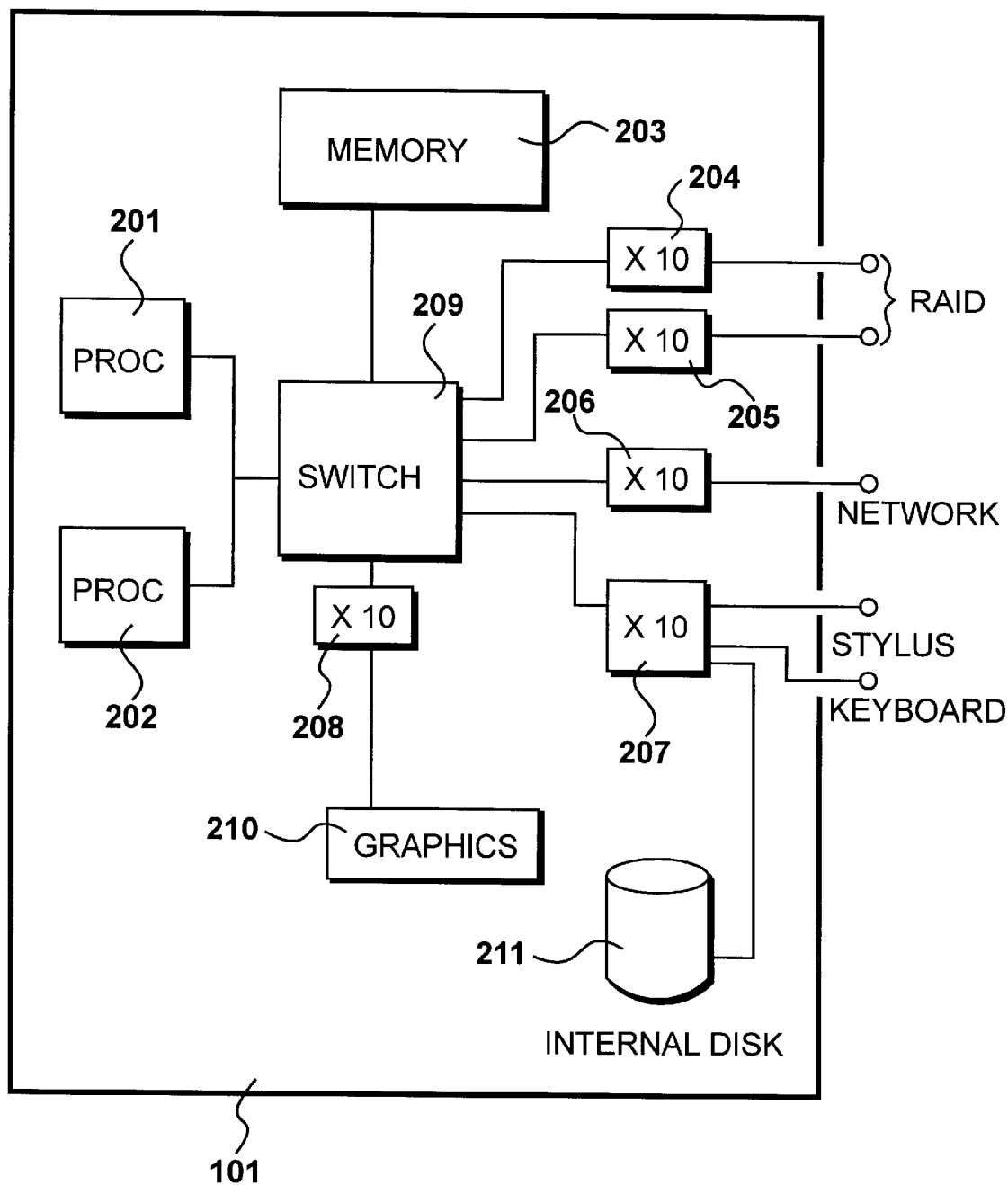
FIG. 2 details the processing system shown in FIG. 1.

The processing system 101 is detailed in FIG. 2. The processing system comprises two central processing units 201 and 202 operating in parallel. Each of these processors is a MIPS R10000 manufactured by MIPS Technologies Incorporated, of Mountain View, Calif. A non-blocking cross-bar switch 209 permits non-blocking full bandwidth communication between the two processors 201 and 202 and with a memory 203 and other peripherals. The memory 203 includes typically two hundred and fifty-six megabytes of dynamic RAM. The memory is used to store instructions for the processors, and data, including a large quantity of element data that is required while performing the process of radiosity simulation. Input and output interface circuits are denoted as XIO in the diagram shown in FIG. 2. External connections, and connections to slow peripherals such as serial ports are made via XIO interface circuits, in order to provide synchronisation between the peripheral circuits and the extremely high speed data paths of the main processor structure.

A first XIO interface circuit 204 provides bi-directional connections to the RAID array 103 shown in FIG. 1. A second XIO interface circuit 205 provides additional connectivity to an additional RAID array, should it become necessary to increase storage requirements for image data. A third XIO interface circuit 206 provides a data connection to a network, over which three-dimensional scene data may be shared. A further XIO interface circuit 207 facilitates connection with the stylus 105 and the keyboard 104 shown in FIG. 1, in addition to an internal hard disk drive 21 1, four gigabytes in size, upon which instructions for the processors 201 and 202 are stored. An additional XIO interface circuit provides a connection between the cross-bar switch 209 and a graphics processor 210. The graphics processor 210 receives instructions from processors 201 and 202 in such a way as to construct a two dimensional image field for display on the video monitor 102.

Figure 3:
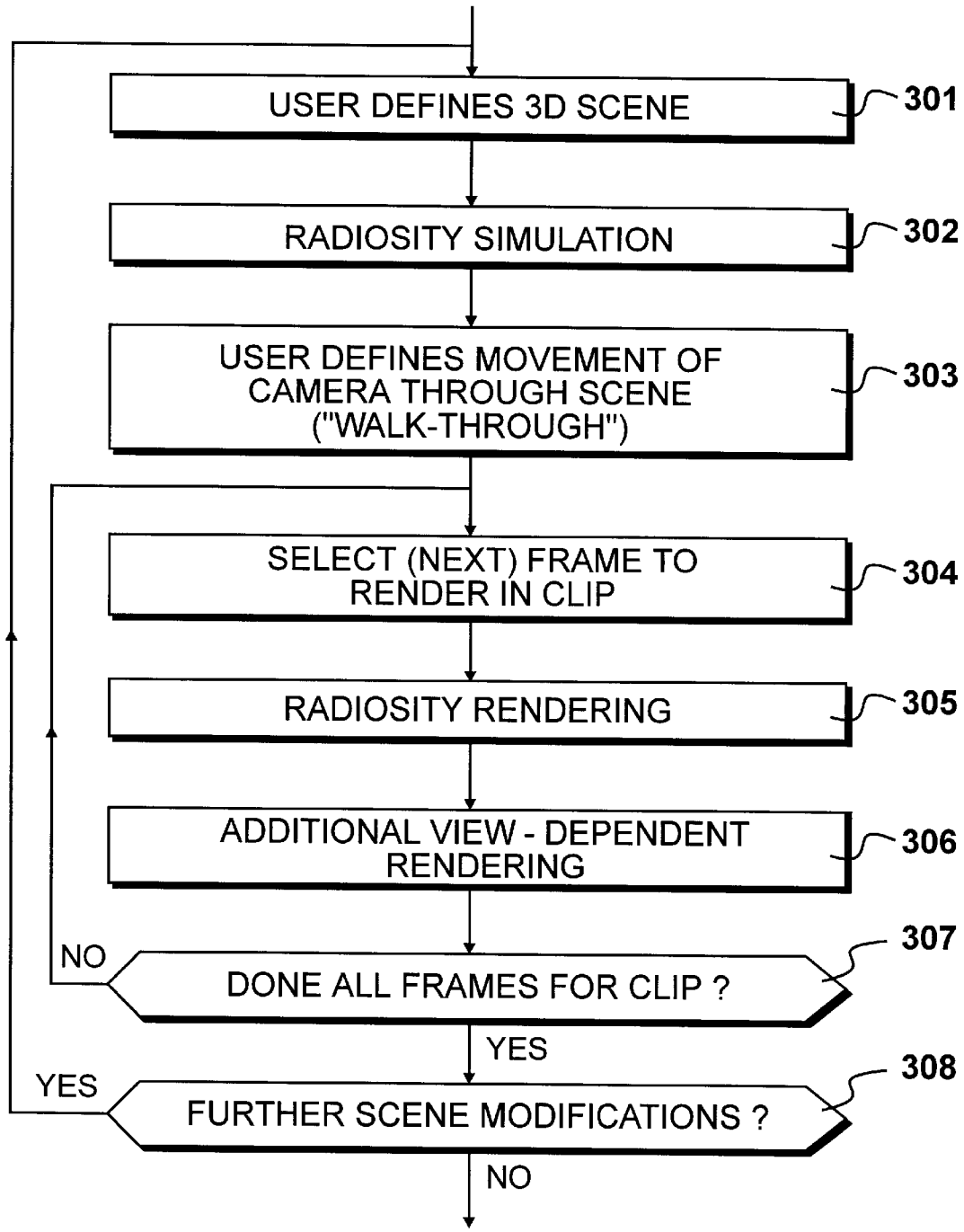
FIG. 3 details processes performed by the processing system shown in FIG. 1 when generating image data, including a process of radiosity simulation.

Procedures performed by processors 201 and 202 are illustrated in FIG. 3. At step 301 a user defines a three dimensional scene, which may involve importing three dimensional information from an external source, for example over the network connection. At step 302 a radiosity simulation is performed, configured to analyse objects within the scene so as to optimise their deconstruction into mesh elements, and then to calculate a light emission value for each mesh element.

At step 303 the user defines movement of a virtual camera through the scene, defining a changing view that is known as a "walk through". The same element light emission values generated by the radiosity simulation procedure 302 may be used for any desired camera view, provided that the relative positioning of objects within the scene does not change.

At step 304 a frame is selected for rendering and at step 305 radiosity rendering is performed. In radiosity rendering, the light emission of each element is projected with respect to the camera position into a two dimensional image plane. At step 306 additional view-dependent rendering is added. Radiosity generates light emission values for elements, irrespective of view. This is known as view-independent rendering. However, certain aspects of a scene may require view-dependent lighting, for example, when a mirror or other highly reflective object is present. In order to achieve photo-realism, it is then necessary to combine the radiosity rendering procedure with light emission values determined by a view-dependent procedure, such as ray tracing. Given that only a small part of the resulting image is view dependent, the additional complexity of the ray tracing procedure need not result in an excessive computational increase. Alternatively, other, less realistic view-dependent procedures may be used for speed. When combined with the high degree of realism provided by radiosity, these can still result in a highly realistic overall image being created.

At step 307 a question is asked as to whether all of the frames for the clip have been rendered. When answered in the negative, control is returned to step 304, whereupon the next frame of the clip is selected and the radiosity rendering procedure 305 is repeated. Eventually, the question asked at step 307 will be answered in the affirmative and control will be directed to step 308. At step 308 a question is asked as to whether aspects of the existing scene need to be modified in order to improve the quality of the result. When answered in the affirmative control is returned to step 301. Eventually, no further modifications will be necessary and the question asked at step 308 will be answered in the negative.

Figure 4:
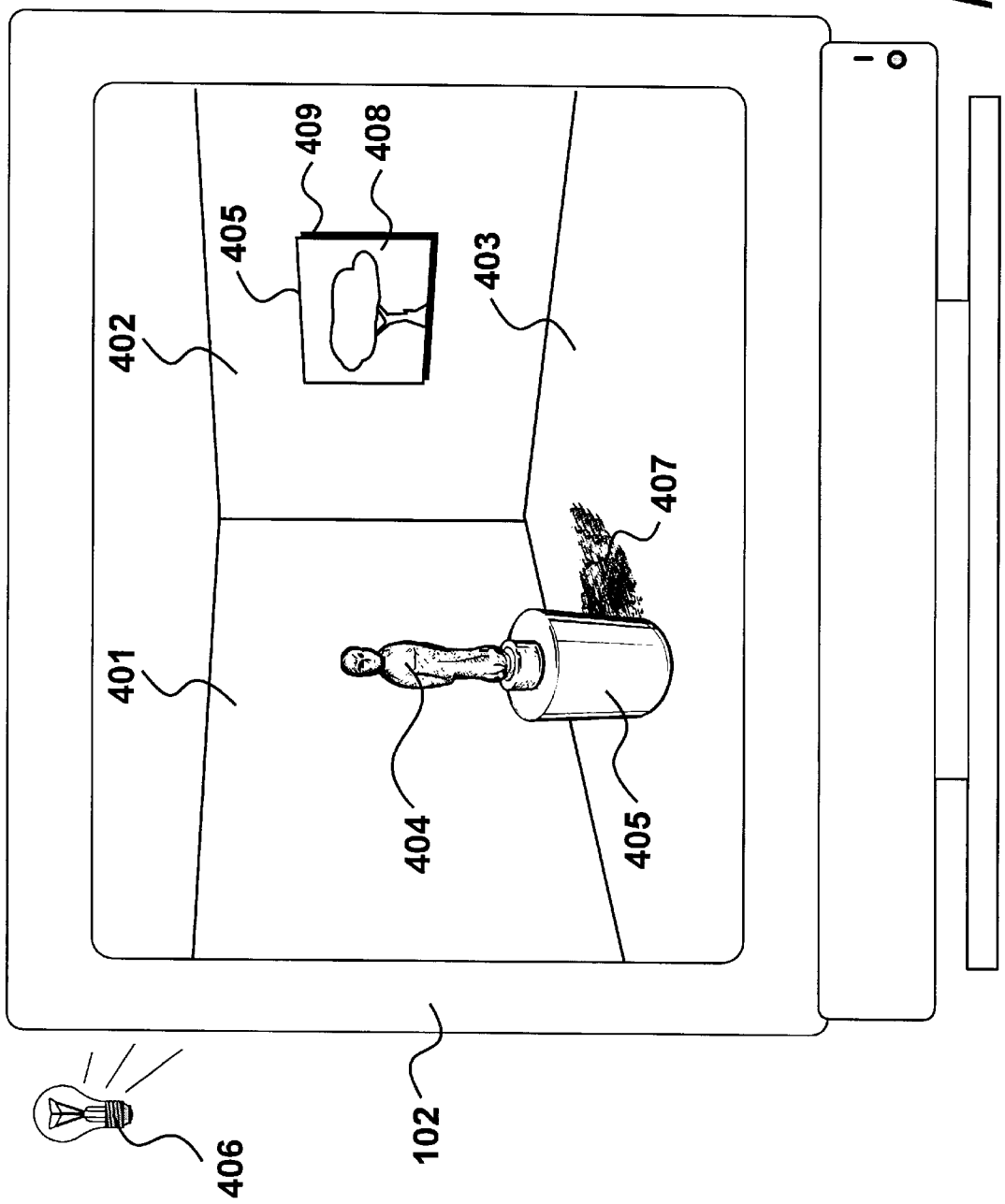
FIG. 4 details an image displayed on the monitor shown in FIG. 1, including several scene objects, that include two walls and a picture.

An example of a scene for rendering using a radiosity procedure is illustrated in FIG. 4. The scene consists of a room including a first wall 401, a second wall 402, and a floor 403. A statue 404 is located on the floor 403 and a picture 405 is shown hung on the wall 402. Radiosity simulation 302 is performed with reference to a light source, illustrated as light source 406, but which, because of the view point defined by the position of the virtual camera, does not itself appear as part of the resulting two dimensional image. The relative positioning of the light 406 and the statue 404 results in a shadow 407 being cast on floor 403. Similarly, given the position of light source 410, a frame 409 of picture 405 also casts a slight shadow 408 against the wall 402.

The presence of a light source in the scene results in a quantity of light energy being introduced. This light energy is scattered throughout the scene in a complex way, that is dependent upon the reflectivities, shapes and positioning of objects within the scene. Radiosity simulation constructs a system of equations to represent these relationships, and is thereby able to determine light emission values that are very realistic.

Figure 5A:
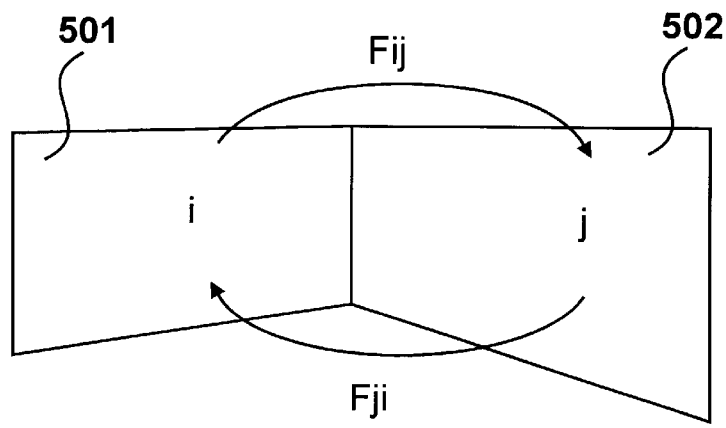
FIG. 5A summarises light energy transfer between a pair of objects, such as the two walls shown in FIG. 4.

The basic approach to performing the radiosity simulation 302 is outlined in FIGS. 5A, 5B, 5C and 5D. FIG. 5A details two elements 501 and 502 in a scene. The two elements are at right angles, such that it can be seen that not all of the light energy from element 501 will be transferred to element 502, and vice versa. The actual proportion of light energy transferred from one element to another is called the form factor. If element 501 is considered to be a source element i, and element 502 is considered to be a receiving element j, the form factor for the transfer of light energy per unit area from i to j is denoted Fij. Similarly, the proportion of energy from element transferred to element i is denoted Fji.

It can be seen from this example that calculating the form factor requires a determination of the visibility of the source element with respect to the receiving element. This is made more complex if a third occluding element is possibly present, which may totally or partially block light transfer between the elements for which the form factor is being calculated. In the event that a scene comprises only two elements 501 and 502, and one of these is a light source, it is possible to construct a pair of simultaneous equations that may be solved in order to obtain the light emission from each element. In practice, however, a scene comprises many objects, each of which may need to be subdivided into a mesh of elements in order to obtain a sufficiently accurate representation of light variation across surfaces.

Given the form factors for all element interactions that are being considered, the total brightness from an element i is obtained by considering the sum of light energies directed at it from all of the other elements in the scene. This relationship is illustrated in FIG. 5B, The fundamentals underpinning the radiosity approach are derived from notions of conservation of energy and the total light energy flux emitted by a particular element is therefore considered as the product between a flux density value B and the area of the element A, identified as the product BA. Thus, for a particular element i, the energy flux radiated by this element is identified as the product $B_i A_i$ which is then considered as equal to the self emission of the element $E_i$ multiplied again by its area $A_i$ plus the sum of all light received from all of the co-operating elements, Thus, for every single co-operating element in the scene, each instance of which is denoted by the letter j, the amount of light received by element i is equal to the flux density $B_j$ of element j multiplied by the area $A_j$ of element j multiplied by the form factor $F_{ji}$ expressing the proportion of light transferred from j to i. The sum of these values is then multiplied by the reflectance $R_i$ representing the reflectance of element i.

As previously stated, the procedure is underpinned by notions of conservation of energy. Therefore, in accordance with this principle, the form factor $F_{ij}$ for the transfer of light energy from i to j, multiplied by the area $A_i$ of element i is equal to the form factor $F_{ji}$ representing the transfer of light energy from j to i multiplied by the area $A_j$ of j, as shown in FIG. 5C. This is known as the radiosity reciprocity equation. This relationship may be substituted into the equation of FIG. 5B to give the equation shown in FIG. 5D, which is known as the classical radiosity equation. In FIG. 5D, the flux density $B_i$ of element i is given by the source flux density $E_i$ of element i plus the reflectance $R_i$ multiplied by the sum for each element j, of flux density $B_j$ multiplied by the form factor $F_{ij}$.

The equation shown in FIG. 5D is the one used to determine light emission values for elements in a scene. In a simplistic approach, in a scene containing fifty thousand elements, the right side of this equation would have to be evaluated fifty thousand times in order to obtain an initial illumination value for a single element i. Thus, in order to calculate an initial illumination value for all fifty thousand elements, the right hand side of this equation must be evaluated fifty thousand times, fifty thousand times. Furthermore, this large number is also the number of form factors that need to be calculated before the system of equations can be solved. Thus, a radiosity simulation utilising this approach is impractical for realistic image synthesis of scenes containing large numbers of elements.

Figure 6:
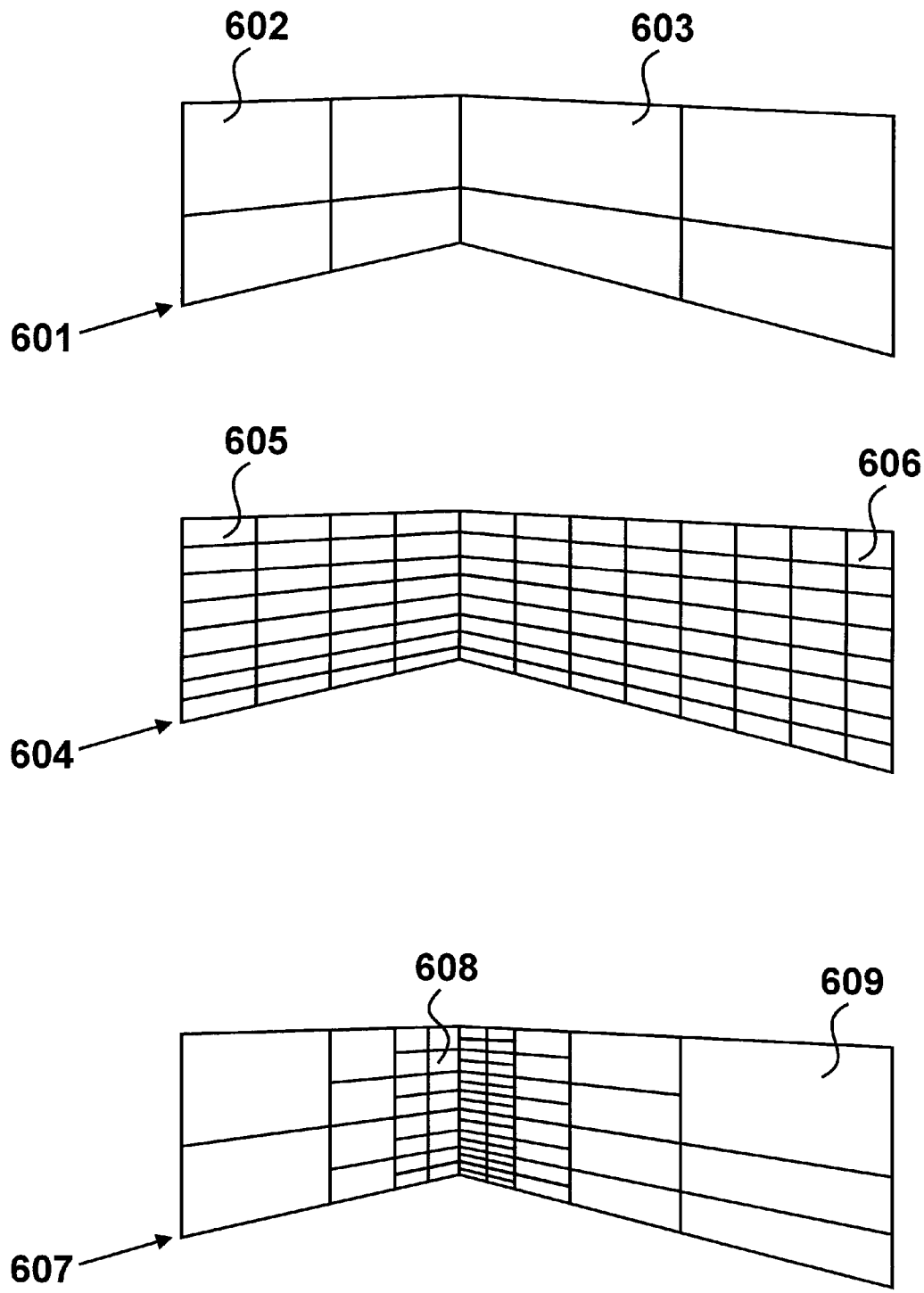
FIG. 6 indicates meshing strategies for the walls shown in FIG. 4.

A solution in which a relatively low number of elements are present is illustrated at 601 in FIG. 6. The image consists of two walls, in which the first wall has been subdivided into four mesh elements 602 and a second wall has also been subdivided into four mesh elements 603. The total number of elements present is relatively small, thereby reducing computational time when evaluating the equation in FIG. 5D, but this in turn results in a coarse image having visible artefacts. This problem may be understood by considering that, although illumination throughout the scene is non-linear, the illumination gradient where the walls meet changes faster than in the middle of a wall. Thus, by rendering the scene at the level of resolution shown at 601, the shading close to the intersection of the walls will be unrealistic.

A solution to this problem is shown at 604. In this example, the walls are the same as those identified at 601 but each wall has been divided into substantially more mesh elements. Thus, a first wall is made up of sixty-four elements 605 with a similar sixty-four element mesh 606 being present in the second wall. This results in a significant improvement of the overall realism of the image but a major increase in terms of computational overhead. It can be seen that the complexity of solving the equation in FIG. 5D increases in proportion to the square of the number of elements present, when this approach is used. Furthermore, it may be understood that while the level of meshing has been increased where this is important, close to the intersection of the walls, it has also been increased unnecessarily in other areas.

Computational time may be reduced while maintaining image quality by taking a hierarchical approach as illustrated at 607. In this example, the walls have been divided into a large number of small elements, such as element 608, at positions where the interaction between the walls is greatest. Similarly, at a distance displaced from the intersection, the elements, such as element 609, are significantly larger. In this way, good image quality is obtained while computational overhead is reduced. This type of meshing is further enhanced by only evaluating form factors between mesh elements at an appropriate level of resolution. For example, a large mesh element at the edge of a wall need not evaluate multiple form factors for interactions between all the small mesh elements on the wall opposite that are close to the intersection. Instead, an appropriate coarse superset of the smallest mesh elements is selected for this interaction. Thus it becomes possible to consider the mesh as a nested hierarchy, such that, whenever possible, coarser mesh elements are used to define light exchanges. The subdivisions of coarse mesh elements are used when the predicted accuracy of light interchange is not sufficiently high. This technique is known as hierarchical radiosity. A data structure representing the nested levels of mesh elements is known as a multi-resolution representation of the radiosity equation.

Hierarchical radiosity may still be time consuming, as there may be many thousands of objects within a scene. Thus, regardless of the efficiency of the hierarchical mesh, there are still a minimum number of interactions that are defined to be the square of the number of objects. In typical photo-realistic scenes, this number may still be prohibitively high. In order to reduce the computation still further, additional procedures have been established in order to extend hierarchical radiosity. In radiosity with clustering, certain combinations of objects, such as the statue 404 shown in FIG. 4, and its base 405, are considered as forming a single cluster element. Interactions with distant elements, such as those comprising a wall 402, may then be expressed by the use of a single form factor, because the light reaching the wall from the statue is weak and blurred. The difference between the statue as it is, and the statue represented, for example, as a single radiating cylinder, will be below the required accuracy threshold when calculating the form factor for light transfer from the statue to the wall. Closer surfaces, such as the nearest wall 401, may need to consider the statue as comprising a number of elements, each having different light emission values, in order to determine local light emission gradients with sufficient accuracy. The combination of hierarchical radiosity with clustering reduces the number of element relationships from n squared to approximately n log n, where n is the number of mesh elements in the scene. It is this reduction in complexity that has enabled the radiosity technique to be considered for use in many applications.

Figure 7:
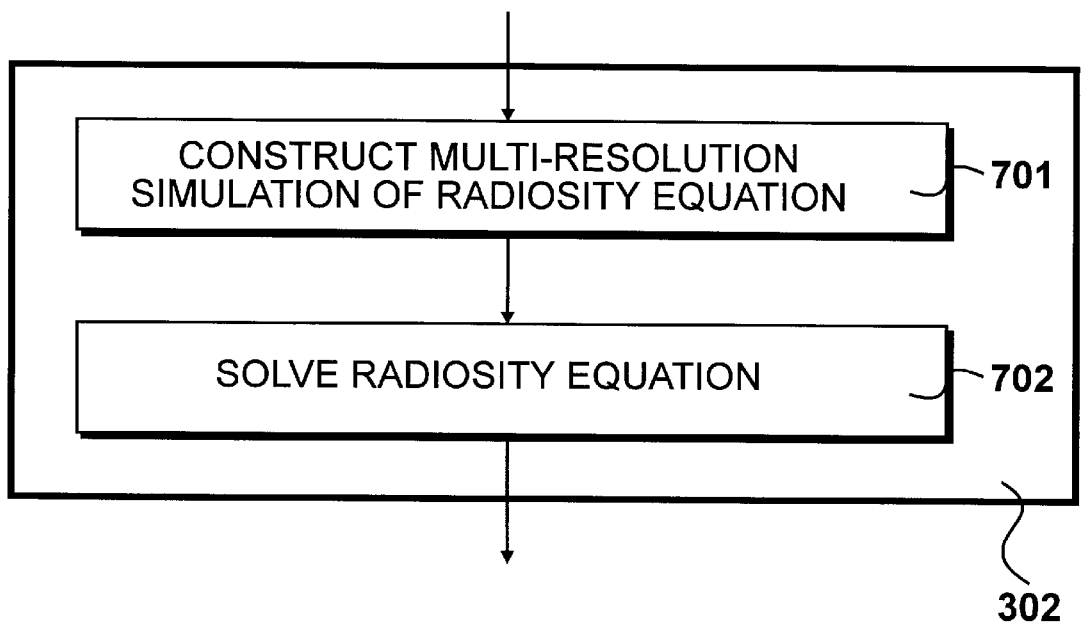
FIG. 7 details the process of radiosity simulation, shown in FIG. 3, including processes of constructing a multi-resolution representation of the radiosity equation, and solving the radiosity equation.

Procedure 302 for performing radiosity simulation is detailed in FIG. 7. At step 701 the multi-resolution representation of the radiosity equation is constructed. At step 702 the radiosity equation is solved.

Figure 8:
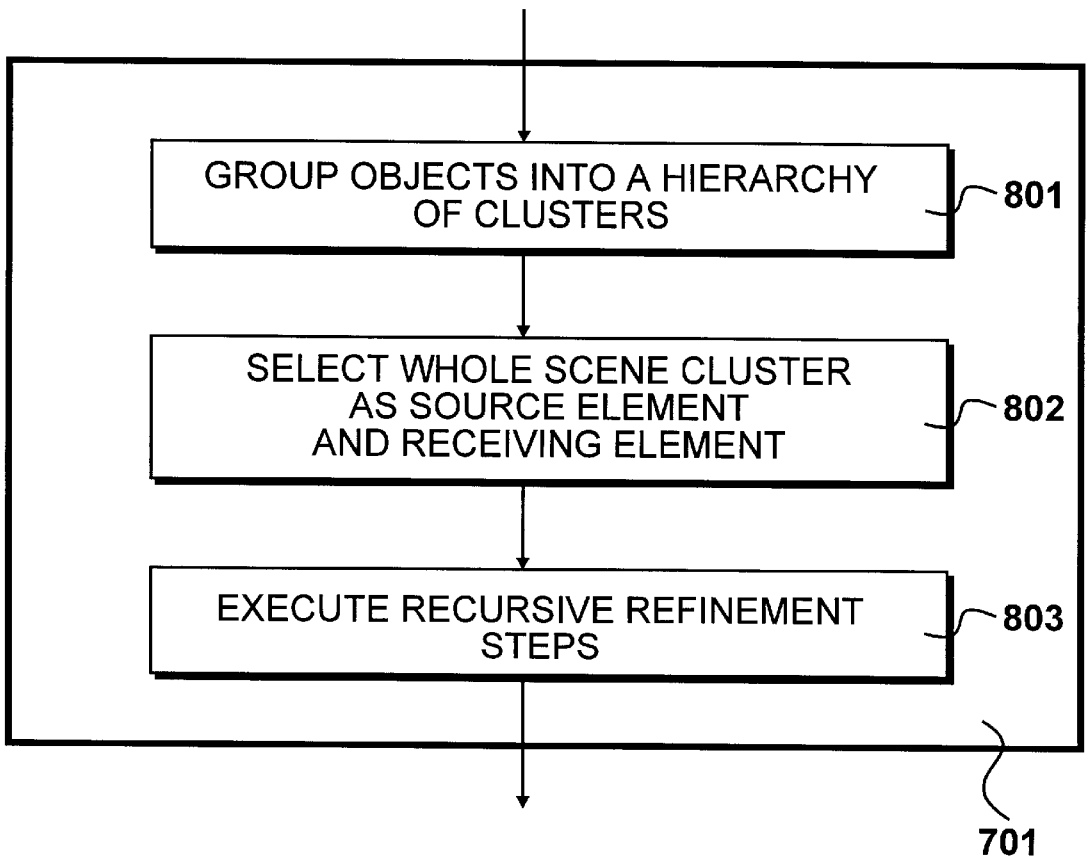
FIG. 8 details the process of constructing the multi-resolution representation of the radiosity equation shown in FIG. 7, including a process of grouping objects into a hierarchy of clusters and a process of executing refinement steps.

Procedure 701 for the construction of a multi-resolution representation of the radiosity equation is detailed in FIG. 8. At step 801 all of the scene is analysed such that a hierarchy of cluster elements is generated. At the top of this hierarchy is a cluster that represents the whole scene. Below this cluster are clusters that represent distinct groups of objects, related by their physical proximity. A method for hierarchical clustering of objects, based on physical proximity, is described in "A Clustering Algorithm for Radiosity in Complex Environments", by Brian Smits, James Arvo and Donald Greenberg, Proceedings of SIGGRAPH '94, pp.435–442, 1994. The lowest level of the cluster hierarchy is the object level. Objects themselves may be considered as elements, in the same way as clusters, and the mesh elements which are created at a later stage of processing.

At step 802, the whole scene cluster at the top of the hierarchy of clusters, is selected as being both a source element and a receiving element. Thus, it is considered as transferring light onto itself. This starting point serves to initiate the recursive refinement process of step 803. At step 803, the whole scene is considered initially as emitting light to itself. The recursive refinement process considers this as resulting in an excessively rough approximation of light shading, and so recursively considers the component clusters and objects for light interactions. Furthermore, the recursive refinement process at step 803 creates mesh elements for the surfaces of objects wherever this is necessary in order to represent the light shading to a sufficient level of accuracy.

Figure 9:
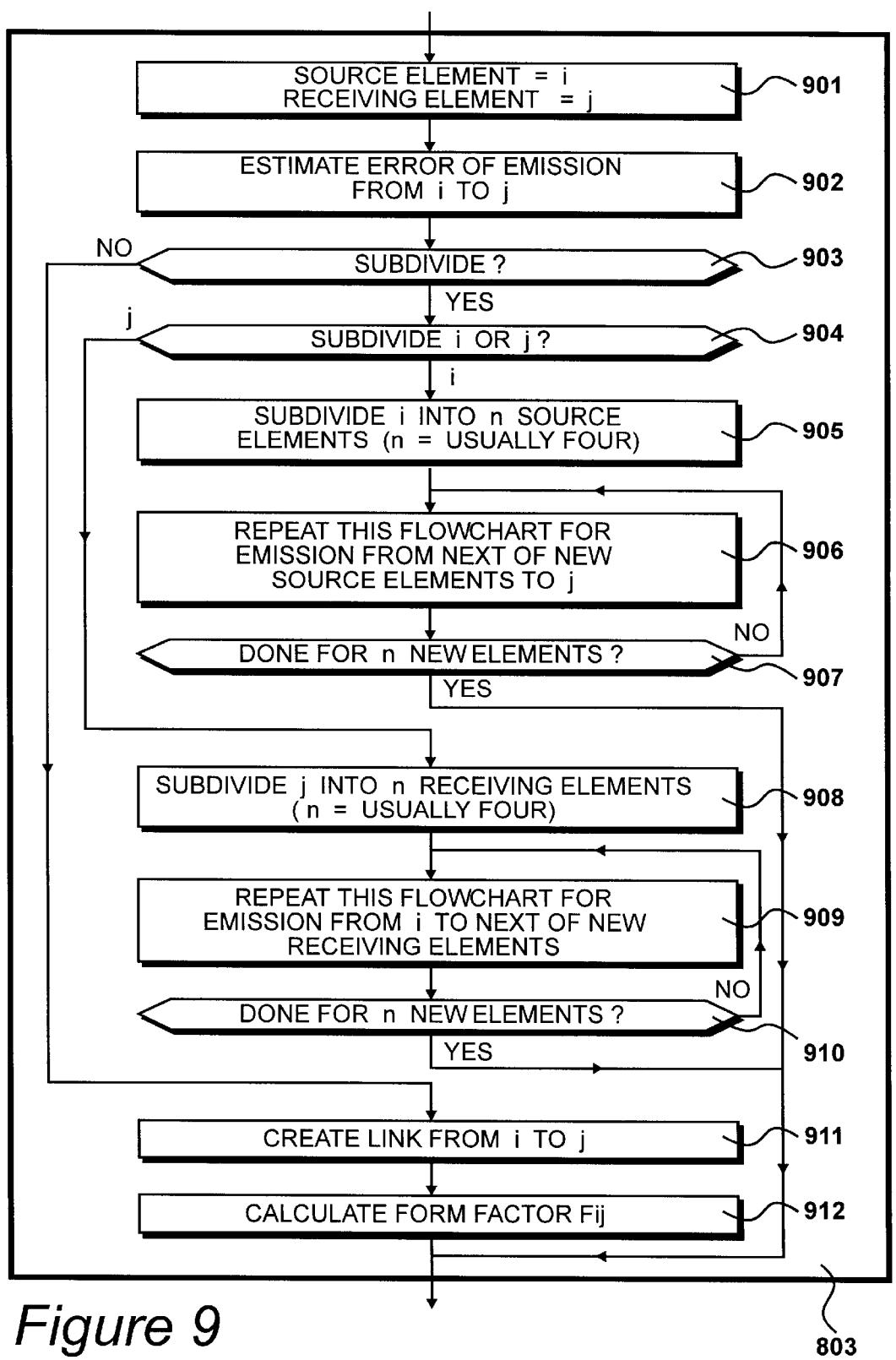
FIG. 9 details the process of executing refinement steps shown in FIG. 8.

The recursive refinement process 803 shown in FIG. 8 is detailed in FIG. 9. A source element and a receiving element will have been selected by either process 802, or subsequent steps 906 or 909 within the same flowchart. These are now initially denoted as source element i and receiving element j at step 901. At step 902 an error is determined for the transfer of light from i to j, wherein i and j are uniformly emissive. Upon initial execution of the flowchart of FIG. 9, as indicated at step 803, the source element i and the receiving element j are both the same, and are the cluster element that represents the whole scene. Inevitably, the error determined for using this light path as the sole radiosity transaction for shading the entire scene results in a very large error in the quality of surface shading. Thus, on the first execution of the process shown in FIG. 9, as represented at step 803, the predicted error generated at step 902 will be very high.

At step 903 a question is asked as to whether a subdivision into further elements is required in order to improve the quality of the simulation. If the estimated error, calculated at step 902, is considered to be sufficiently small, subdivision is not required and the question asked at step 903 is answered in the negative. The question asked at step 903 is also answered in the negative if, within the constraints of the system, it is no longer possible to facilitate subdivision into smaller elements. Alternatively, if the error value estimated at step 902 is too high, the question asked at step 903 is answered in the affirmative.

At step 904 a question is asked as to whether it is appropriate to subdivide the source element i or to subdivide the receiving element j. Again, an error estimation approach is taken and a selection is made which results in the lowest estimated error, or the predicted highest simulation quality, being produced. If a selection is made to the effect that the source element i is to be subdivided, i is subdivided into source elements at step 905. Subdivision of a cluster results in the identification of component cluster elements, and or component object elements. If, however, the element that is being subdivided is an object, the subdivision process at step 905 may create new elements. Typically, when a mesh is being created, this will result in the element being split up into four new elements. At subsequent levels of recursions, these mesh elements may themselves be further split, into usually four new elements, and so on, until the desired level of resolution is achieved in order to attain the required level of quality.

If an assessment is made at step 904 to the effect that the receiving element j is to be subdivided, control is directed to step 908 and a subdivision of j into receiving elements, in a similar manner, is performed at step 908.

At step 906, the processes of the flowchart shown in FIG. 9, and of which step 906 is a part, are repeated, by considering each of the newly identified element subdivisions as a source element. This step is a recursive step, and when this step is performed, at the next level of recursion, it may be understood that each of the newly identified source elements is then considered in its turn as element i, as determined at step 901. On exiting the recursive step at step 906, control is directed to step 907, where a question is asked as to whether any additional newly identified elements remain to be considered as emitters. If answered in the affirmative, control is directed back to step 906, where the next newly identified element is considered. Alternatively, all new elements have been considered. This represents the exit condition for the whole of the flowchart of FIG. 9.

Similar processes are performed at steps 908, 909 and 910, where newly identified elements are considered as receiving elements. In the recursive step 909 each newly identified receiving element is considered as receiving element j at step 901 in the next level of recursion.

Subdivisions continue to be created recursively until the question asked at step 903 is answered in the negative. At this point, a specific element has been defined as an appropriate source element and an appropriate element has been defined as a suitable receiving element. At step 911 a link is created between these elements which establishes that a transfer of light is considered as being effected between these elements for the purpose of radiosity calculations. Thereafter, at step 912, a form factor Fij is calculated representing the interaction in terms of light being transferred from the source element i to the receiving element j.

After the execution of step 912 it is likely for the procedure to be within a recursive operation. Under these circumstances, emerging from step 912 is equivalent to emerging from step 906 or step 909.

Eventually, all of the elements will have been considered from the clusters at the highest level down to the smallest newly created mesh elements. This results in links and form factors being generated across a variety of levels, for example between large clusters and small elements, between clusters, and between small mesh elements. In total, this complex network of relationships defines light interactions between all surfaces in the scene, but at levels of resolution appropriate to the level of quality that is required. Thus, less links are created when a chair cluster interacts with a distant wall cluster, than if the component objects of these clusters were to be considered, in all their combinations, as an appropriate description for light energy transfer. These links, therefore, are established between appropriate levels in the hierarchy of elements, such that interactions are only considered which result in equal to or just above the required level of image quality.

Figure 10:
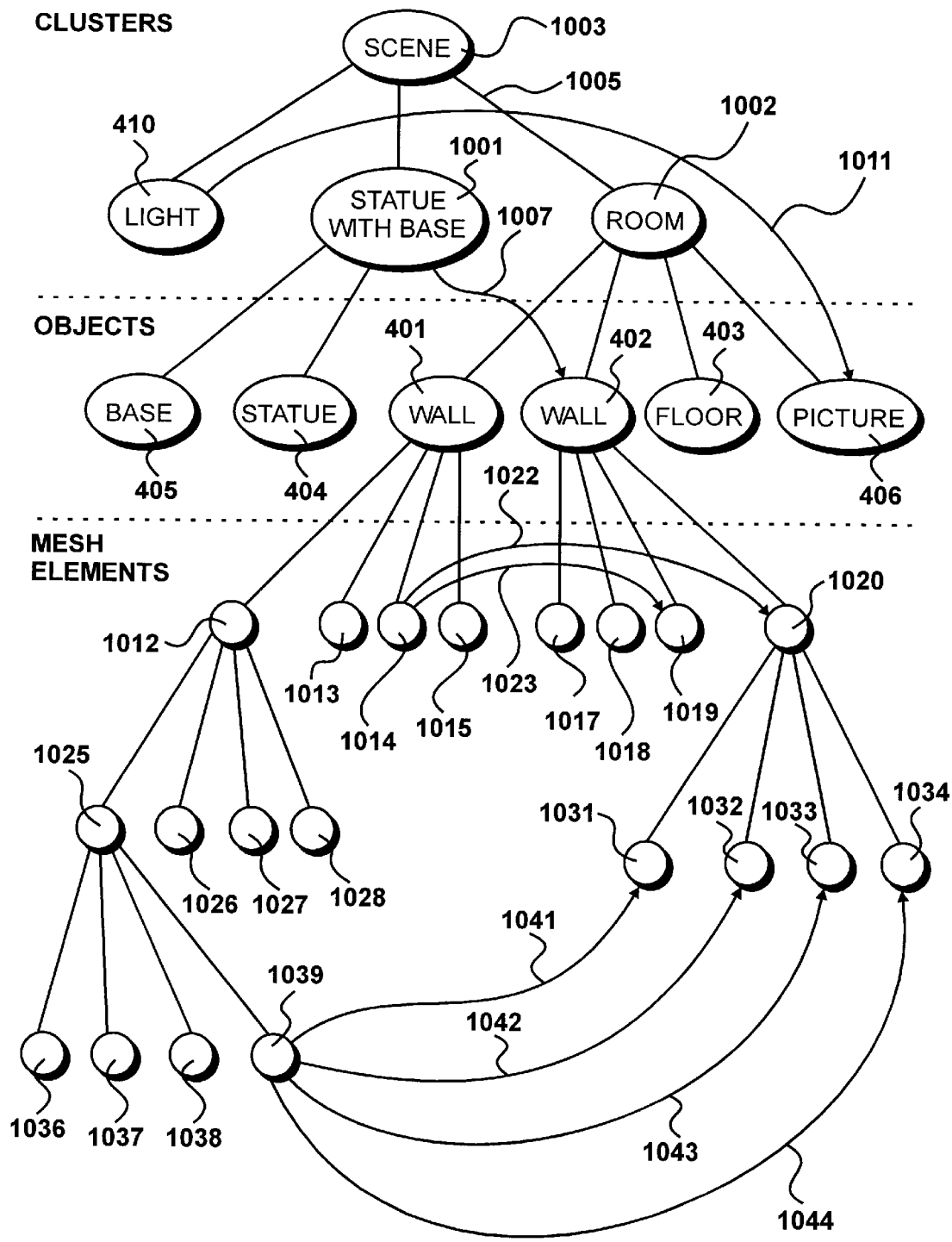
FIG. 10 illustrates data structures arising from executing the refinement process shown in FIG. 8 with respect to the objects indicated in FIG. 4.

Operations performed in accordance with the recursive procedures illustrated in FIG. 9 result in a linked structure being developed of the type represented in FIG. 10. Objects at a first level representing an object within the scene shown in FIG. 4 may be recursively subdivided into constituent elements until a level is reached at which the smallest required mesh elements are established. Objects include the statue base 405, the statue 404, the first wall 401, the second wall 402, the floor 403 and the picture 406. Within the data structure, these objects are clustered so that the base 405 and the statue 404 may be considered as a statue with base cluster 1001. Similarly, the first wall 401, the second wall 402, the floor 403 and the picture 406 are considered as a room cluster 1002. The statue with base cluster 1001 and the room cluster 1002 are then unified into a scene cluster 1003, which also includes the light source 410.

In the illustration shown in FIG. 10, straight lines, such as 1005 connecting the scene 1003 with room 1002, represent a geometric relationship between elements. Radiosity links, generated in step 911 in FIG. 9, are illustrated by curved arrowed lines, such as line 1007 illustrating an interaction between the statue and base cluster 1001 with the second wall object 402. This interaction is expressed by a form factor associated with the link that represents the amount of light transferred from the statue with base cluster 1001 to the wall 402.

The data structure illustrated in FIG. 10 does not attempt to be complete, and only shows a small fraction of the structure that would be created in order to fully represent the interactions in a typical scene such as the one shown in FIG. 4.

As an example, the recursive refinement procedure detailed in FIG. 9, will endeavour to define an interaction between the first wall 401 and the second wall 402. On this occasion, a calculated error value given at step 902 is too high for form factors to be used in terms of wall 401 transferring light to wall 402 and in terms of wall 402 reflecting light back to wall 401. Consequently, in order for the required level of quality to be achieved, it is necessary for these walls to be recursively divided into smaller elements and for the interactions to be defined in terms of appropriate element levels in preference to the interaction directly between the wall objects. The wall 401 has been subdivided into four mesh elements 1012, 1013, 1014 and 1015. Similarly, wall object 402 has been subdivided into mesh elements 1017, 1018, 1019 and 1020.

Link 1022 shows that it is possible to calculate a valid form factor with element 1014 being a source element and element 1020 being a receiving element. Similarly, link 1023 shows that it is possible to calculate a valid form factor with element 1014 as a source element and element 1019 as a receiving element. However, the required level of quality cannot be achieved if form factors are established for element 1012 as a source element and element 1020 as a receiving element. In order to generate appropriate calculations with respect to this portion of the scene, it is necessary to further recursively subdivide these elements.

Thus, when considered as a source element, element 1012 is subdivided into four elements 1025, 1026, 1027 and 1028. Similarly, as a receiving element, element 1020 is further subdivided into elements 1031, 1032, 1033 and 1034. However, further recursion has indicated that element 1025 requires further subdivision, resulting in the generation of mesh elements 1036, 1037, 1038 and 1039. At this level, it is now possible to make progress and it has been established that a form factor can be calculated with element 1039 as a source element and element 1031 as a receiving element illustrated by link 1041. Similarly, link 1042 shows that element 1039 may be a source element and element 1032 may be a receiving element. Further recursion on the receiving side is not required and element 1020 is fully satisfied as a receiving element in relation to element 1039 by links 1043 and 1044 connecting to elements 1033 and 1034 respectively.

The relationship with mesh element 1039 and elements 1031 to 1034 shows that the recursive refinement steps of FIG. 9 have been performed to a sufficient depth in order to provide the level of quality required.

FIG. 10 presents a graphical illustration of the type of data structure that is used for the multi-resolution representation of the radiosity equation. It will be understood that a true representation for a typical scene containing many thousands of objects would be impossible to present in the form of an illustration, and FIG. 10 is intended purely as an indication of data structures that are being used.

Figure 11:
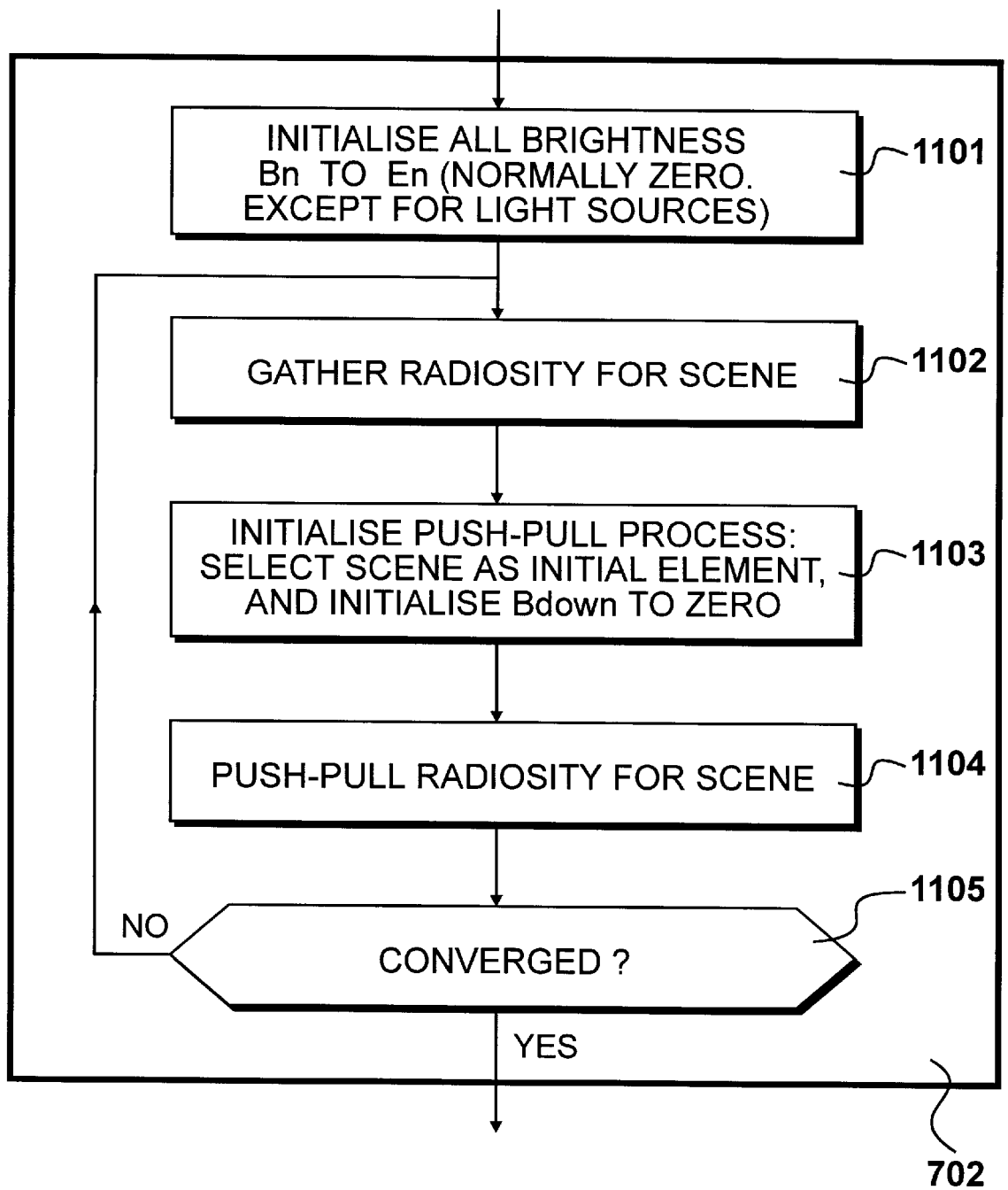
FIG. 11 details the process of solving the radiosity equation shown in FIG. 7, including a process of gathering the radiosity for the scene, and a process of push-pull radiosity for scene.

Procedure 702 for the solving of the radiosity equation is detailed in FIG. 11. Each element and object in the scene has an illumination value, and it is the purpose of the radiosity equation to determine an illumination value Bi for all n elements within the scene. The illumination values will be made up from self emissions from the elements or objects themselves, which will be zero except for light sources, in combination with contributions from other elements to which links have been constructed of the form indicated in FIG. 10.

At step 1101 all illumination values for all of the elements Bn are initialised to be equal to their self emission values En which, with the exception of the light sources, will be zero.

At step 1102 illumination contributions for the scene are gathered. For each element, incoming contributions, defined by incoming links, are summed to provide an initial illumination value. These illumination values are not complete in that incoming links occur at different levels. Thus, referring to FIG. 10, element 402 receives a contribution from element 1001 via link 1007. In addition, its sub-elements 1017 to 1020 also receive contributions from element 1014 etc such that, the gathering process identified at step 1102 will result in values being accumulated at element 402 and for example, values being gathered at element 1020. However, in reality, element 1020 represents a portion of element 402 and the illumination of element 402 should be equal to the area average of the illumination values of its sub-elements 1017 to 1020.

In order to determine accurate values for the elements, taking account of contributions made at different mesh elements levels, a push-pull radiosity procedure is performed at step 1104. In order to initiate this procedure a variable Bdown is set to zero at step 1103.

After completing the push-pull radiosity operation for the first time, processes 1102, 1103 and 1104 are repeated, such that a first iteration may be compared against a second iteration to determine the extent to which estimated illumination values are converging to a stable solution. If the difference between results of these iterations is still considered to be too large, thereby indicating that convergence has not taken place, the question to this effect is answered in the negative at step 1105, and a further iteration of steps 1102 to 1104 is repeated. The question at step 1105 is asked again and ultimately sufficient convergence should take place such that the question asked at step 1105 is answered in the affirmative. Typically eight to twelve repetitions of these steps will be required in order to reach a suitably stable set of illumination values.

Figure 12:
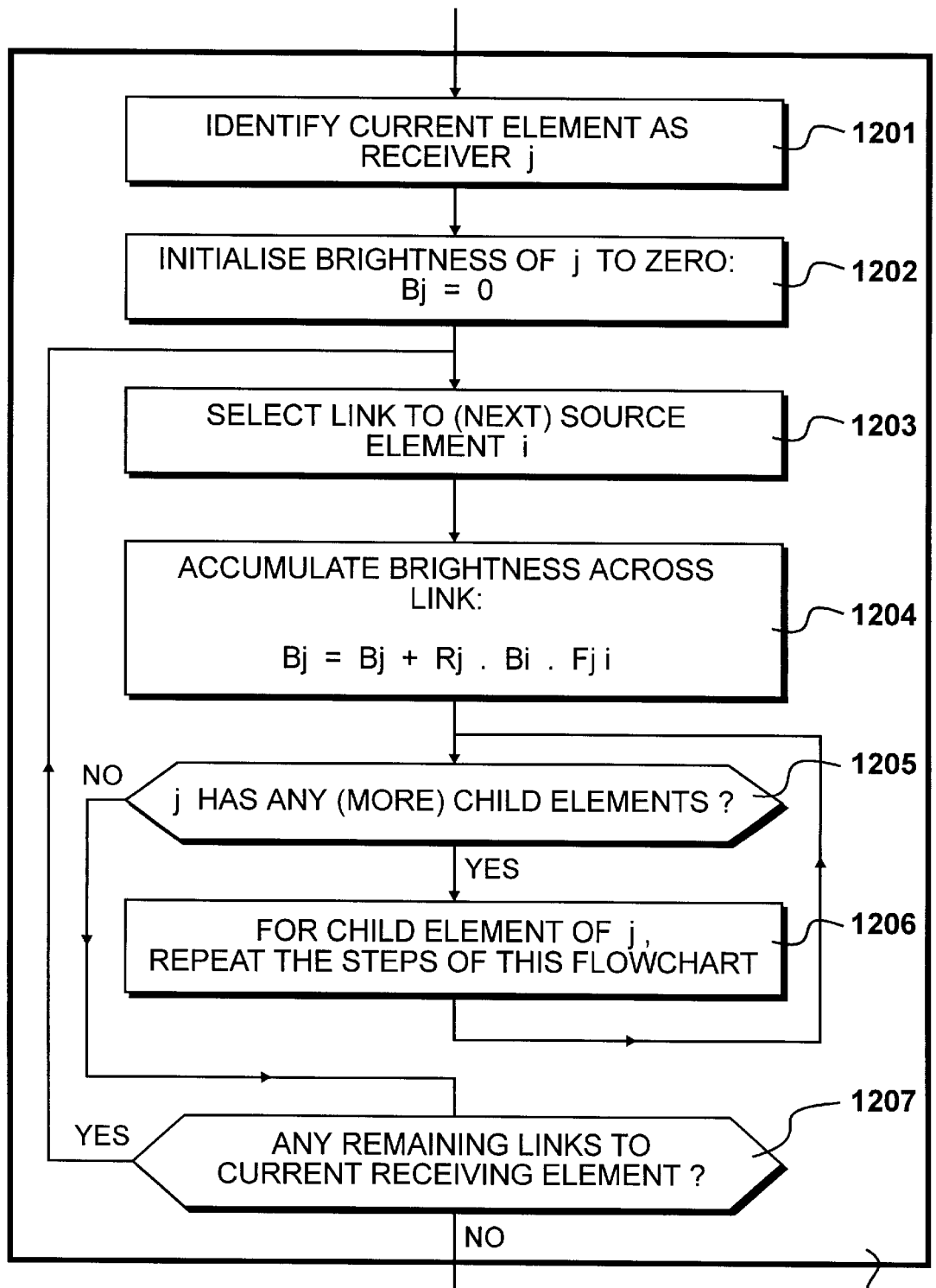
FIG. 12 details the process of gathering the radiosity for the scene shown in FIG. 11.

A known method for step 1102, gathering radiosity for the scene, shown in FIG. 11, is detailed in FIG. 12. At step 1201 a current element is identified as a receiver j and at step 1202 the illumination of j is initialised to zero.

A loop is initiated at step 1203 where the next link to a source element, identified as element i, is selected. At step 1204 the illumination across the link from element i to element j is accumulated and at step 1205 the question is asked to whether element j has any more child or sub-elements to be considered. If this question is answered in the affirmative, the whole procedure 1102 is recursively called at step 1206. This repeats until all of the sub-elements have been considered, whereafter at step 1207 a question is asked as to whether any remaining links to the current receiving element are present. When answered in the affirmative, control is returned to step 1203 and the next link to the receiving element j is selected.

Figure 13:
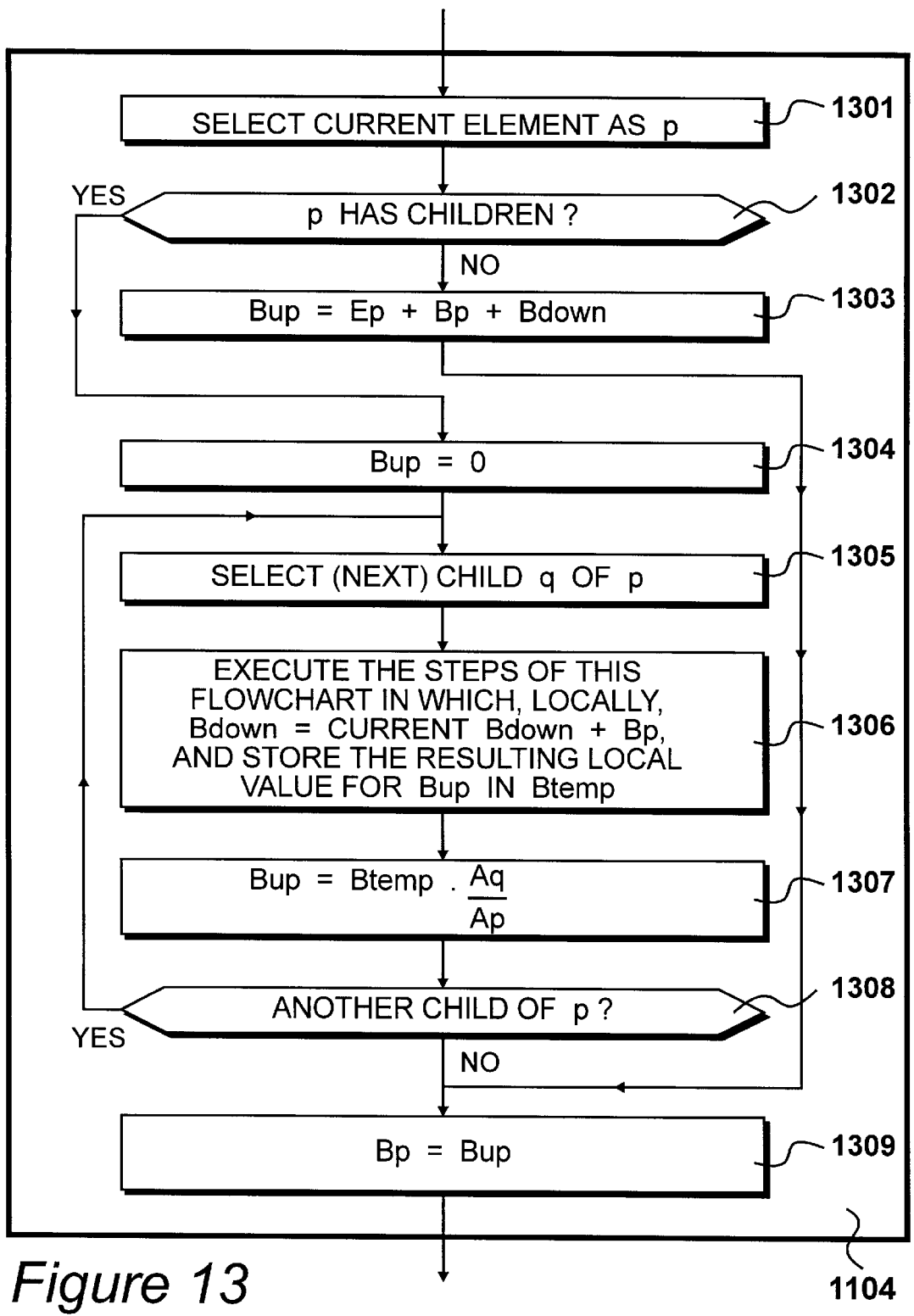
FIG. 13 details the process of push-pull radiosity for the scene shown in FIG. 11.

A known procedure for step 1103, the push-pull process for the illumination in the scene, shown in FIG. 11 is detailed in FIG. 13. At step 1301 the current element is considered as p and on the first loop the current element will be that of the highest level of the structure shown in FIG. 10 which, in this example, would be the whole scene represented by cluster 1003. At step 1302 a question is asked as to whether p, selected at step 1301, has child elements and when answered in the affirmative control is directed to step 1304. At step 1304 a variable Bup is set equal to zero, whereafter at step 1305 a next child q of selected element p is selected.

Thereafter, the whole of the procedure shown in FIG. 3 is recursively executed at step 1306. Within the execution of the recursive step, a local value for Bdown is set equal to the current value for Bdown plus Bp, that is the illumination gathered directly at the parent element p. The result, in terms of a local value for Bup is stored in variable Btemp. Thereafter, control is directed to step 1307.

At step 1307 variable Bup is set equal to value Btemp, the local value determined by the recursive call to procedure 1306, which is then multiplied by the area of the child divided by the area of the parent to compute an area average.

At step 1308 a question is asked as to whether another child of p is present and, when answered in the affirmative, control is directed back to step 1305. When all of the children have been considered, the question asked at step 1308 will be answered in the negative and control is directed to step 1309, resulting in a new value for Bp being set equal to Bup. When the question asked at step 1302 is answered in the negative, to the effect that the current element p does not have any children, Bup is set equal to Ep, the self emission value for element p, plus Bp plus Bdown, and control is directed to step 1309.

In an alternative embodiment, the steps shown in FIG. 7 are performed iteratively, as part of a loop. The purpose of this is to facilitate a more accurate determination of error values, upon which decisions are made about the level of meshing that is to be performed. In the iterative process, during the first pass of the steps shown in FIG. 7, at step 701, the multi-resolution representation is constructed for a first error tolerance, eps_1, and then at step 702, the radiosity equation is solved to yield a first solution, On the next iteration, the error tolerance is reduced, to eps_2. However, the multi-resolution representation constructed at step 701 in the previous iteration is already valid down to the eps_1 level of error tolerance. Thus, to continue to the reduced level of error tolerance, given as eps_2, the pre-existing multi-resolution representation can be continued by further addition of mesh elements and establishing links, and there is no wastage in having to recalculate existing data structures. A third and additional iterations may then be performed.

A first purpose of this multi-pass method is to enable a rough display of the radiosity solution to be previewed more quickly than if the fully detailed solution is created in one stage. It is possible, then, for an operator to identify obvious deficiencies at an early stage. A further advantage is that the first, or early solutions, provide subsequent solutions with information about the magnitude of light transferred across links, and not just the magnitude of the form factor. This information can be used to improve the accuracy by which errors are predicted, such that even pairs of surfaces with large form factors do not need to be respectively meshed, if the actual light that would be transferred across those links is insignificant. This form of iterative refinement is known as BF refinement.

Figure 14:
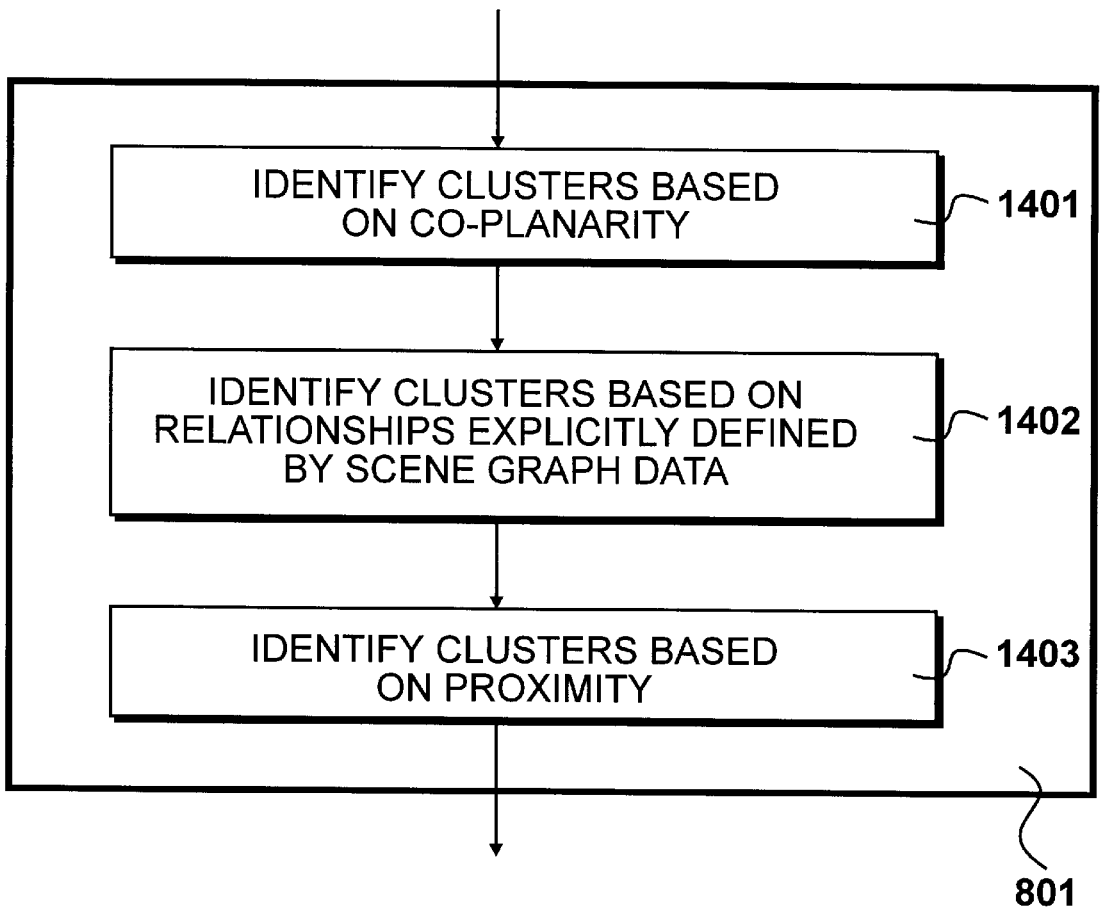
FIG. 14 details the step of grouping objects into a hierarchy of clusters shown in FIG. 8, including a step of identifying clusters based on co-planarity and a step of identifying clusters based on relationships explicitly defined by scene graph data.

Step 801 for grouping objects into a hierarchy of clusters, shown in FIG. 8 is detailed in FIG. 14. At step 1401 clusters are identified based on co-planarity. At step 1402 clusters are identified based on relationships explicitly defined by scene graph data. At step 1403, clusters are identified based on proximity. An algorithm for implementing step 1403 shown in FIG. 14 is described in "A Unified Hierarchical Algorithm For Global Illumination With Scattering Volumes And Object Clusters", in IEEE transactions on visualisation and computer graphics, September 1995, by Frangois X Sillion. The steps shown in FIG. 14 identify clusters according to specialised criteria as well as general criteria, such as physical proximity.

The identification of clusters based on co-planarity, at step 1401, considers polygons within the scene and identifies those polygons that are nearly coplanar. Co-planarity is a useful characteristic for identifying clusters. Clusters that are coplanar, for example surfaces of a wall, possibly including a picture, can be identified as reflecting primarily in a particular direction. This contrasts with general clusters based on physical proximity, that are known in the art, where geometric properties of objects within a cluster are assumed not to be known, and therefore considerable generalisation must be made about the properties of such clusters. This results in the estimate of error of transmission from i to j performed at step 902 in FIG. 9, for such clusters, being higher than if some information is known about the geometric properties of objects within a cluster.

The invention identifies cluster elements in response to a characterising relationship between elements, such that a form factor for said cluster is determined in response to this characterising relationship. Furthermore, a method for calculating a form factor is selected in response to a characterising relationship for a cluster, thereby improving the accuracy with which form factors may be calculated when a characterising relationship between elements in a cluster is known.

By identifying clusters based on a geometric property that affects the reflection of light, such clusters are more likely to be used more frequently as the basis for links within the multi-resolution simulation of the radiosity equation illustrated in FIG. 10. The use of such clusters, possibly in combination with other types of clusters, will then reduce the amount of memory required to store the multi-resolution representation of the radiosity equation, and also increase the speed at which a simulation may be performed. An algorithm for the identification of nearly coplanar polygons is identified by David Salesin and Filippo Tampieri in their chapter "grouping nearly coplanar polygons into coplanar sets", Graphics Gems III, ISBN 012-409673-5, 1992. Thus, nearly coplanar polygons may be identified using this algorithm and, if considered suitable, a cluster of the nearly coplanar polygons may be identified.

Figure 15:
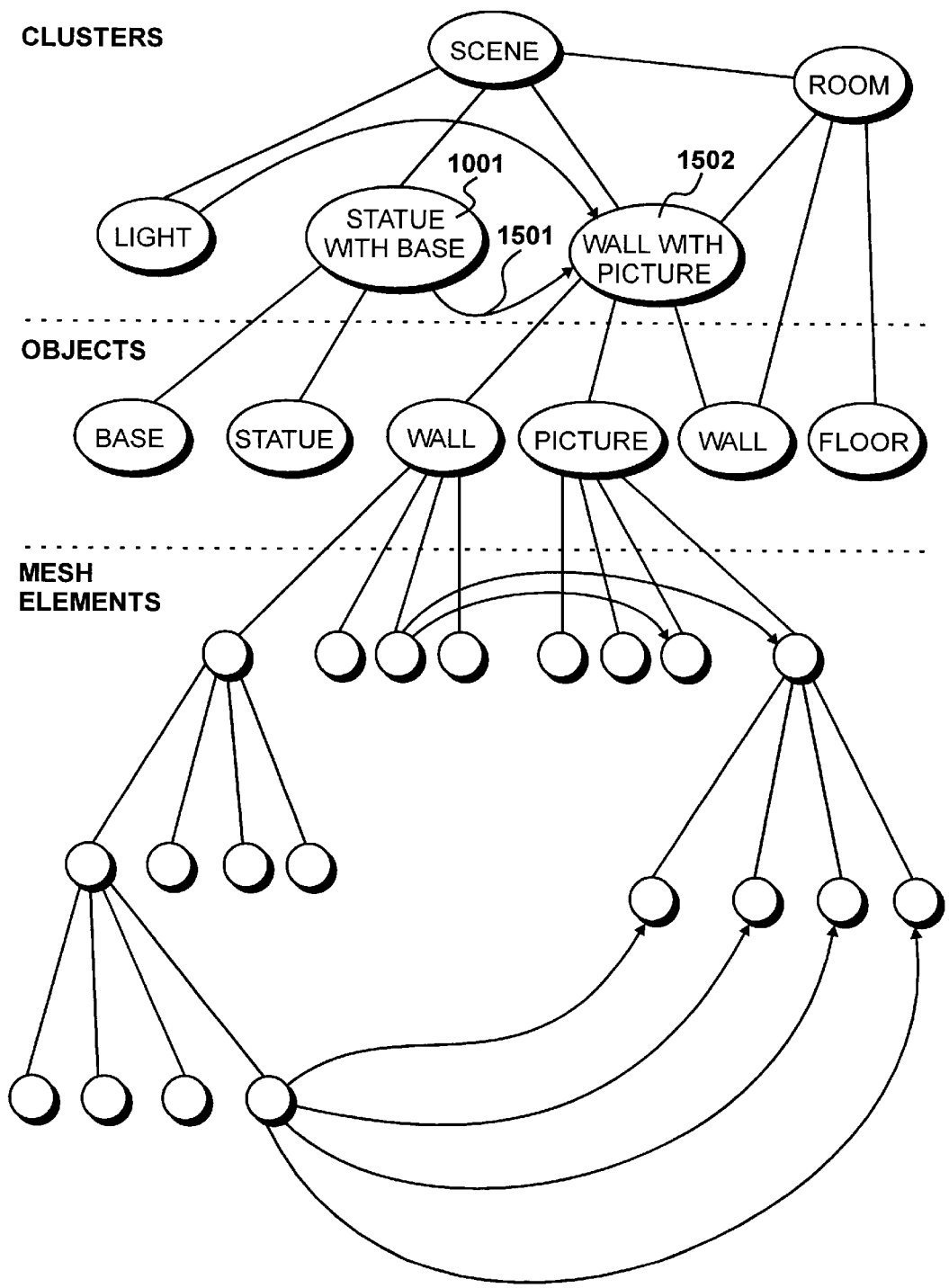
FIG. 15 illustrates the result of performing the step of identifying clusters based on co-planarity shown in FIG. 14.

The result of identifying clusters based only on proximity is illustrated in FIG. 10. Clustering in response to co-planarity is illustrated in FIG. 15, where an additional cluster has been identified, in addition to those shown in FIG. 10. The additional cluster is the wall with picture. FIG. 4 includes a wall 402, upon which a picture 409 is hanging. The picture and the wall are nearly coplanar, in that the picture will be slightly offset from the wall by a distance determined by the thickness of the frame. As far as light interactions with the statue are concerned, the picture on the wall is fairly distant, so it is possible to consider both the picture and the wall as being within the same cluster. This is indicated in FIG. 15 by the additional link 1501 from the statue with base cluster 1001 to the new wall with picture cluster 1502, identified as a result of step 1401 shown in FIG. 14. It should be understood that FIG. 15 is merely an example and in a real scene, in which tens of thousands of objects are clustered, the advantages of clustering according to co-planarity will be considerably greater than if only one such link was generated.

Figure 16:
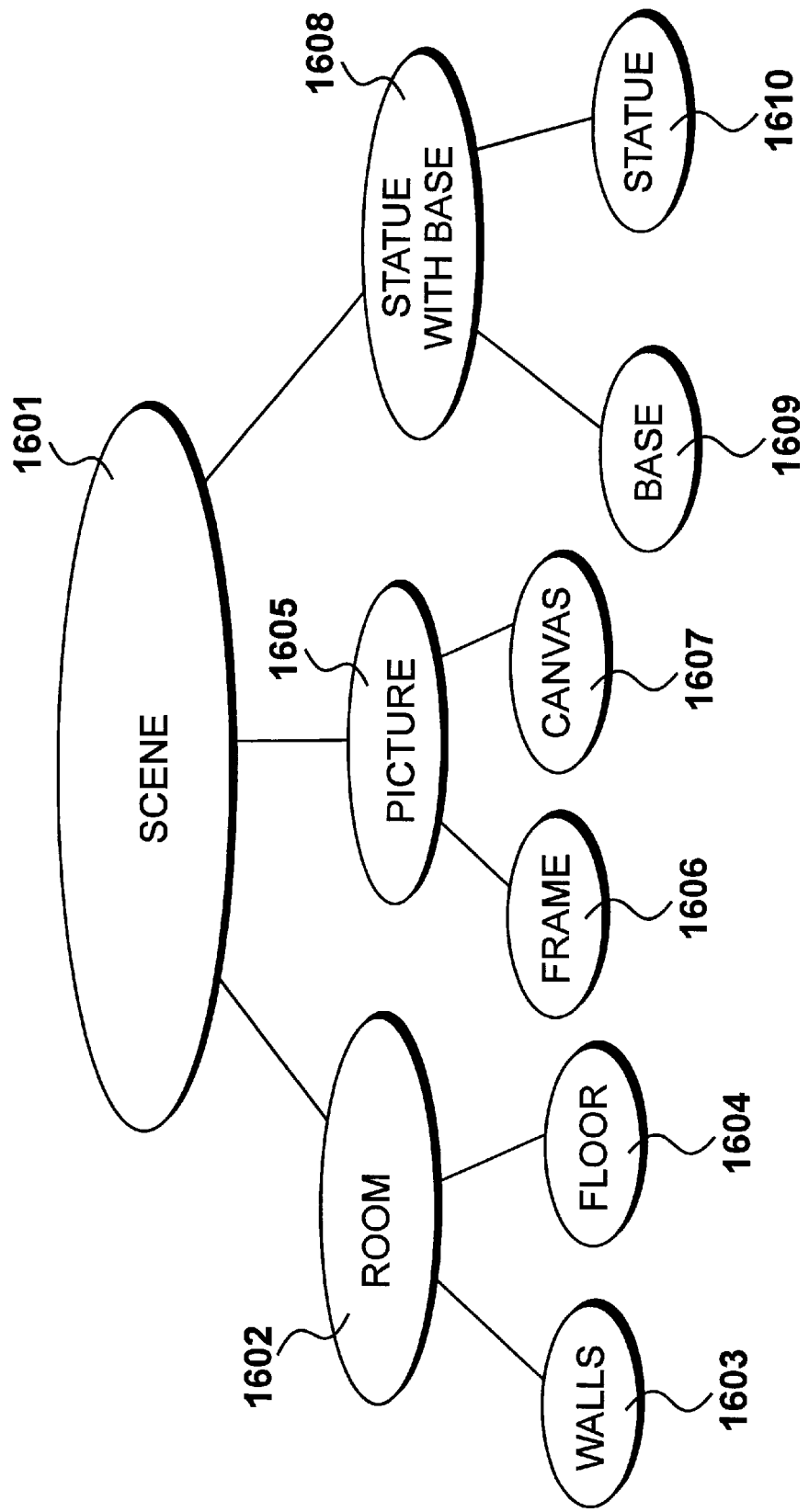
FIG. 16 illustrates scene graph data that is analysed by the step of identifying clusters based on relationships explicitly defined by scene graph data as shown in FIG. 14.

The identification of clusters based on relationships explicitly defined by scene graph data, indicated at step 1402, utilises scene graph data from which the scene shown in FIG. 4 was originally generated. In the art, radiosity simulation is performed upon data supplied as primitive polygons that have been produced as a result of interpreting a scene description using a scene editing procedure. By considering the scene graph that was originally created in order to describe the scene shown in FIG. 4, it may be possible to advantageously identify relationships between objects in the scene graph that are suitable for use as clusters. A scene graph of the type that would be used to generate the scene shown in FIG. 4 is illustrated in FIG. 16. At the top of the scene graph is an item that describes the whole of the scene 1601. Below this, are components of the scene. These include the room 1602, which comprises walls 1603 and floor 1604. Other components of the scene are the picture 1605, comprising the frame 1606 and the canvas 1607. In addition, the scene comprises the statue with base 1608, which includes the base 1609 and statue 1610.

Scene graphs are constructed hierarchically so that associated items may be moved about together. So, for example, the statue with base may be rotated translated and scaled as a single item. The structure shown in FIG. 16 is usually lost when the scene is translated into a series of polygons which are supplied to the radiosity simulation process. However, in accordance with the present invention, the original scene graph data may be analysed in order to identify suitable clusters.

In the present example, the statue with base 1608 has been identified originally in the scene graph shown in FIG. 16. This data is usually ignored, and, possibly, the association of the base with the statue may be recreated as a cluster as a result of executing step 1403, where clusters are identified on the basis of physical proximity. However, this is an expensive and time consuming process, and likely to miss out associations that are appropriate for clustering. For example, the picture 1605 shown in FIG. 16 comprises a frame 1606 and a canvas 1607. It is possible, that the picture is not identified as being suitable as a cluster in its own right, and that frame and canvas objects may be left un-clustered. For a certain level of light interaction, this would result in an increase in the level of complexity of what would theoretically be possible if the frame 1606 and canvas 1607 had been associated as a cluster.

The specialised clusters have characteristics that enable the number of calculations required when linking clusters to be reduced. This can be for two reasons. Firstly, the form factors calculated with respect to specialised clusters may be determined to a higher degree of accuracy, because geometric characteristics of the elements within the cluster are known that affect light interactions. Thus, a specialised cluster is able to be used more often than if the same clustered elements were considered as a general cluster, containing no more in common than their physical proximity.

A second reason for the reduction in calculations is that certain properties may be implicit within a specialised cluster. For example, the visibility of a cluster of co-planar surfaces can be more accurately determined, because a single plane equation can be used when considering interaction with other elements in the scene. Knowledge of visibility is used in visibility culling, which reduces the number of elements in the scene for which detailed form-factor calculations are to be performed. Thus, the simplified process of visibility culling that is used for co-planar clusters results in an overall reduction in the calculations required to determine form-factors with other elements. This contrasts with non-specialised clusters, whose visibility may be a complex phenomenon due to the layout of internal surfaces, requiring calculations of intra-cluster visibility between elements in order to determine the overall visibility of the whole cluster.

Different computation procedures are associated with the different cluster types. These procedures take advantage of the particular properties of a cluster to compute essential quantities, such as visibility and form factors, more efficiently and with less error.

Figure 17:
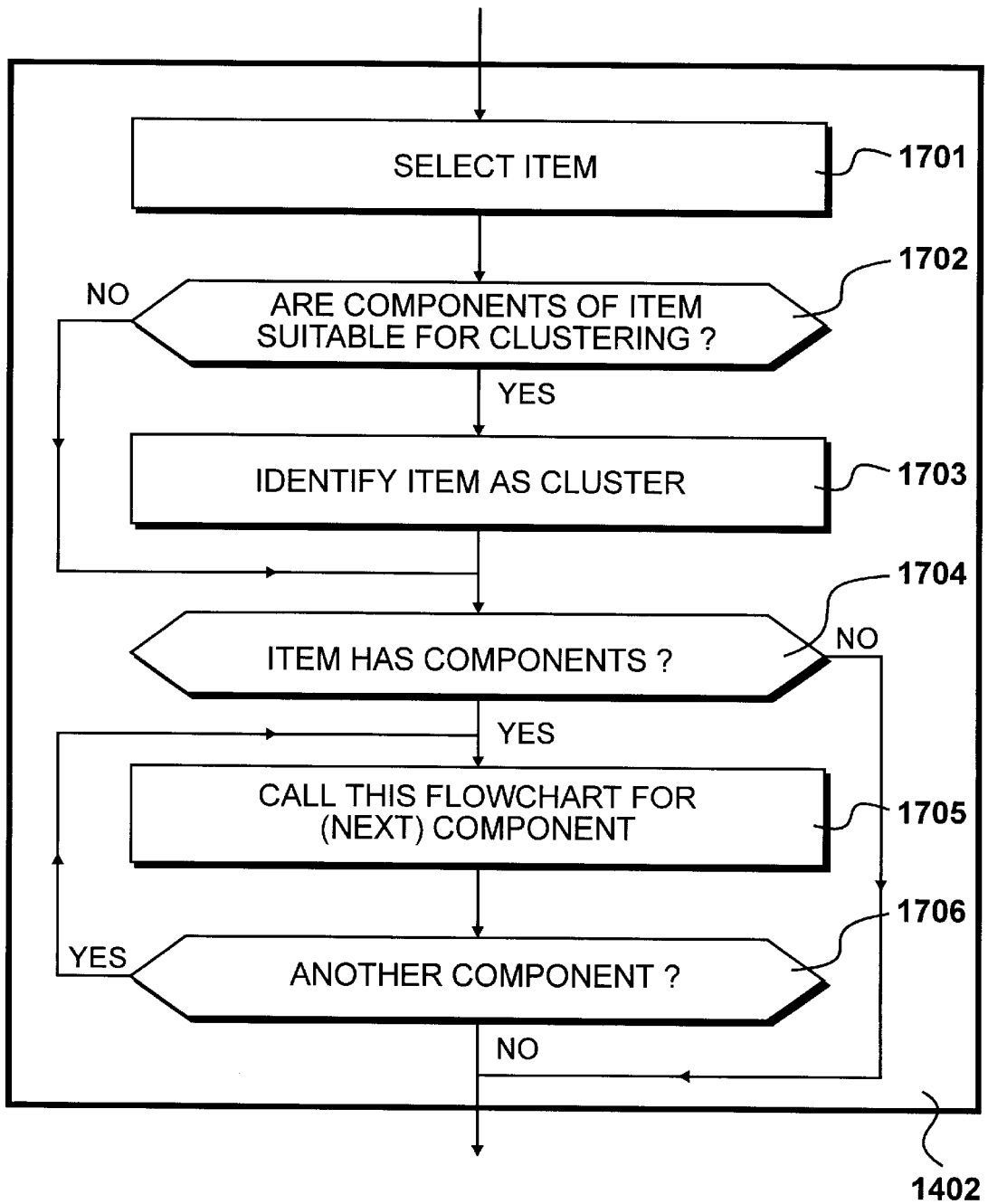
FIG. 17 details the process of identifying clusters based on relationships explicitly defined by scene graph data shown in FIG. 14.

A plurality of methods for identifying clusters may be used, including the identification of clusters based on relationships explicitly defined by scene graph data, indicated at step 1402 in FIG. 14; as detailed in FIG. 17. At step 1701 an item is selected for consideration. Initially the item that is selected will be the entire scene 1601 shown in FIG. 16. At step 1702 a question is asked as to whether components of the item are suitable for clustering. This question may be answered on the basis of a number of criteria, including physical proximity. However, it will be understood that objects under consideration are explicitly defined within a scene graph structure, and such considerations are considerably less complicated to handle than if relationships are not explicitly defined. If the components of the item are not suitable for clustering, control is directed to step 1704. Alternatively, if components are considered suitable for clustering, control is directed to step 1703.

At step 1703 the item that has been selected at step 1701 is identified as a cluster, and data structures for clusters are updated. At step 1704 a question is asked as to whether the selected item has component items. In the initial case, the scene 1601 clearly has many components. Thus, in the present example, control would be directed to step 1705 where the flow chart shown in FIG. 17 is called recursively for the next component of the item currently under consideration. Within each recursive call, the component that has been selected is then considered as the next item at step 1701.

Thus, the scene graph is traversed to all levels, such that clusters may be identified within clusters. Alternatively, clustering at a higher level may not be considered appropriate, and clusters may be identified at a lower level, for example the frame and the canvas of the picture 1605. At step 1706 a question is asked as to whether another component is to be considered. If answered in the affirmative, control is directed back to step 1705 and the next component of the currently selected item at step 1701 is considered as an item within a recursive call of the flow chart shown in FIG. 17.

Finally, there will be no more components to be considered, and the result of asking the question at step 1706 will be negative, thereby concluding the operations performed by the flowchart shown in FIG. 17. If the question asked at step 1704 is answered in the negative, this represents a condition where the scene graph structure has been analysed to its lowest level, and the current level of recursion must be exited so that other branches of the tree may be traversed in the same way. This continues until all branches have been traversed and the scene graph has been analysed completely.

As a result of this complete analysis, a number of clusters will have been identified, based upon data stored within the scene graph. Because the relationships are explicitly defined in the scene graph, there is considerable advantage in using this data in order to analyse object relationships for clustering, compared to analysis of raw polygon data generated as a result of processing the scene graph.

FIG. 14 identifies specialised clusters at steps 1401 and 1402 prior to general clusters being identified at step 1403. This has the advantage that clusters identified in steps 1401 and 1402 may be themselves identified as elements for combination in a larger cluster at step 1403. Step 1403 identifies clusters based on physical proximity, and ignores characterising relationships. As a result of completing the processes shown in FIG. 14, a number of clusters are identified, including clusters with characterising relationships. Once these clusters have been established, it then becomes possible to construct the multi-resolution representation of the radiosity equation to the same level of accuracy but using a reduced number of links, than when clusters are identified without knowledge of a unifying characteristic.

Figure 18:
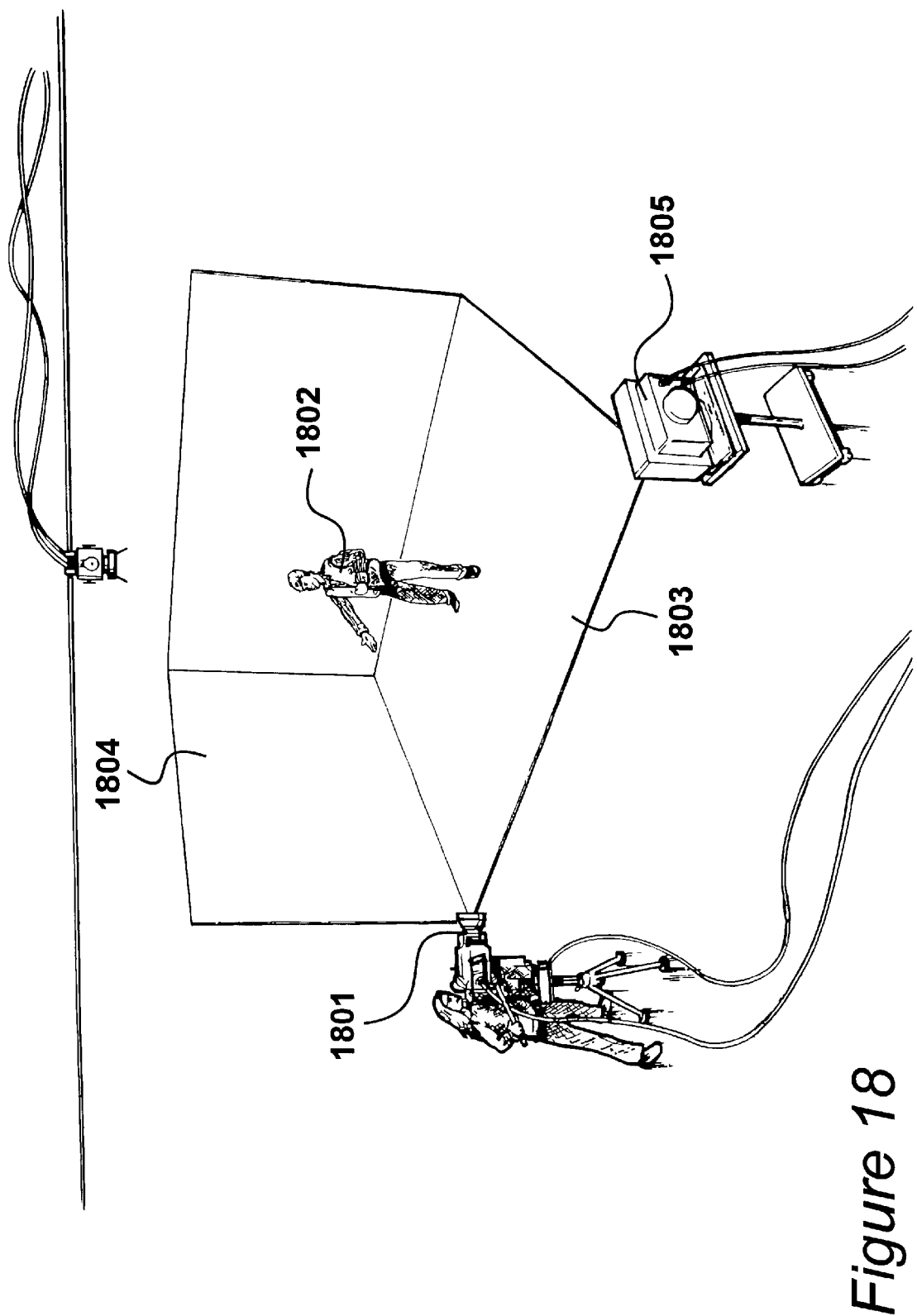
FIG. 18 shows a virtual set for generating live video data.

The artificial scene shown in FIG. 4 may be combined with images from a real studio, such that artificial objects, walls and studio features may be superimposed upon a real studio in which minimal features are present. The combination of real and artificial images in this way results in the creation of a virtual set, in which real and virtual objects may be mixed. An example of a virtual set is shown in FIG. 18. A camera 1801 generates live video image data, as well as serial positioning data and lens data. The camera is aimed at talent 1802, located in the centre of a blue screen environment, comprising a blue screen floor 1803 and walls 1804. The blue colour of the walls is carefully controlled and calibrated in such a way as to facilitate automatic replacement of any blue areas of the subsequently processed camera images with a corresponding virtual image. A monitor 1805 facilitates visual feedback for the talent, such that it is possible to interact in a more natural way with objects in the virtual world.

Figure 19:
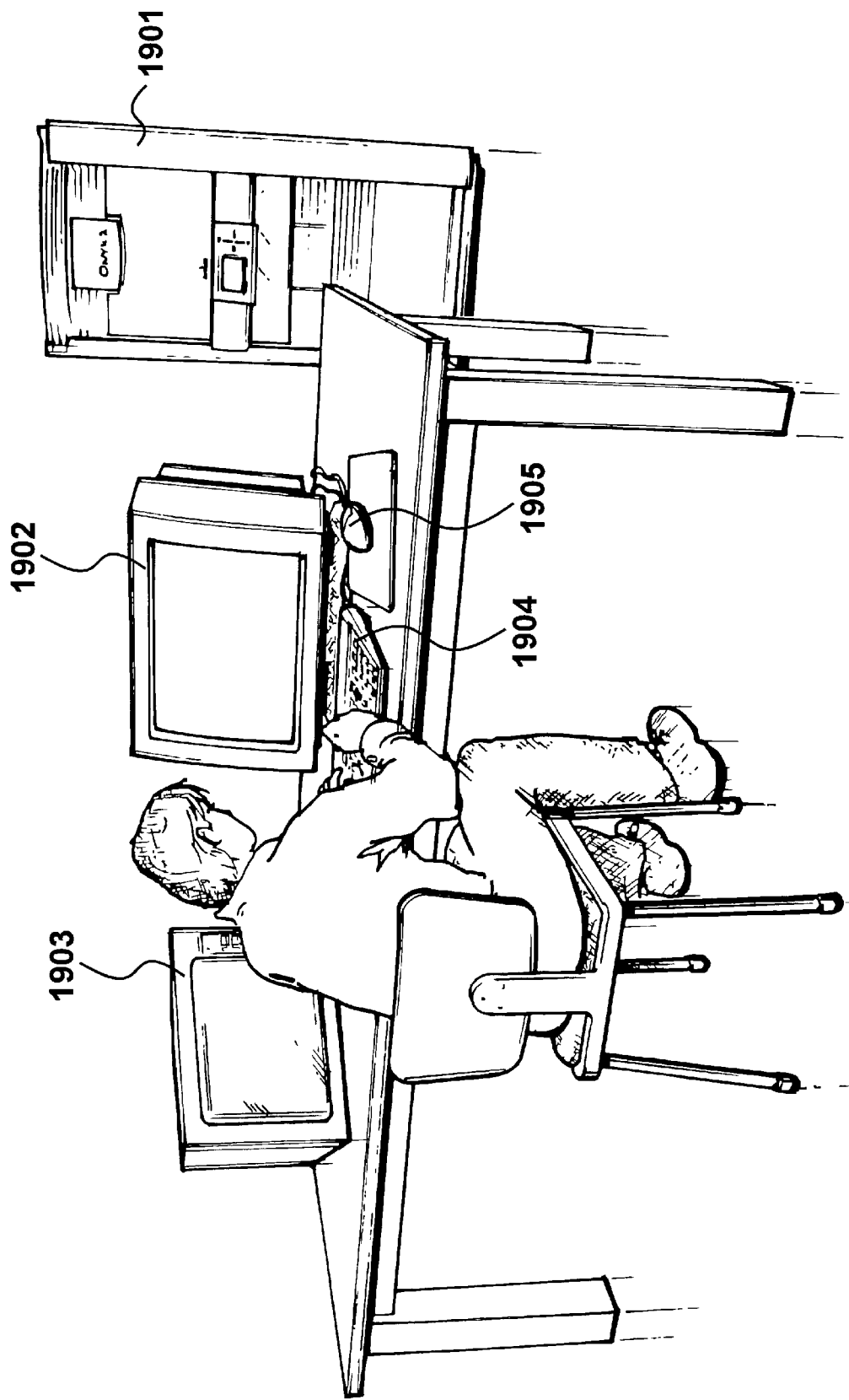
FIG. 19 details equipment for combining camera data with scene data in real-time.

Equipment for compositing image data from the virtual set shown in FIG. 18 with artificial scene images such as the one shown in FIG. 4, is detailed in FIG. 19. A main processor 1901, such as an Onyx2™, manufactured by Silicon Graphics Inc, receives image and position signals from the camera 1801 shown in FIG. 18. The position information from the camera, together with lens data, including zoom and focus, enable a calculation to be made of the viewpoint of the camera with respect to the virtual set. The walls of the virtual set are calibrated in position, so that at least one of either the floor or the two walls may be used as a reference plane that will match with a corresponding floor or wall plane in the artificial scene shown in FIG. 4. Commands for controlling the virtual environment are performed by the operator using a mouse 1905, a keyboard 1904 and a monitor 1902. A high quality broadcast monitor 1903 is also provided on which to view the results of the compositing process.

The operator has control over such parameters as blue screen removal, floor plane or wall plane tolerance mapping, quality control, ensuring that calibrations are maintained and so on. The main processor 1901 renders the scene shown in FIG. 4 in accordance with the radiosity simulation process described previously. Once this step has been performed, it then becomes possible to render the scene from any viewpoint. In a virtual set, the viewpoint is defined by the camera position and lens conditions. Thus, the main processor 1801 performs radiosity rendering in response to signals from the camera 1801. The rendered scene is then keyed with the real video data using a blue screen keyer process, such that the talent 1802 appears to be in a highly realistic scene, comprising the objects shown in FIG. 4. As is known, additional lighting effects may be added, in order to support view dependent lighting.

I claim:

1. A method of constructing a multi-resolution representation of a radiosity equation for a scene, wherein said scene comprises object elements; comprising the steps of:

identifying specialised cluster elements by associating object elements having a characterising relationship; and linking and/or meshing elements in response to an estimate of error of light transmission between elements; wherein said linking includes calculating a form factor; and when linking a specialised cluster, said form factor is calculated with reference to said characterising relationship.

2. A method according to claim 1, further including the step of identifying generalised cluster elements by associating object elements in close proximity to each other; and when linking a cluster, a procedure for calculating said form factor is selected in response to said cluster type.

3. A method according to claim 1, wherein said characterising relationship relates to light reflectance.

4. A method according to claim 1, wherein said characterising relationship is that of near co-planarity.

5. A method according to claim 1, wherein said characterising relationship is determined with reference to scene graph data.

6. A method of constructing a multi-resolution representation of a radiosity equation for a scene, wherein said scene comprises object elements; comprising the steps of identifying specialised cluster elements by associating object elements having a characterising relationship;

identing general cluster elements by associating object elements according to proximity; and linking and/or meshing elements in response to an estimate of error of light transmission between elements; wherein said linking step includes calculating a form factor; and when linking a cluster, selecting a method of form factor calculation in response to the cluster type.

7. A method according to claim 6, wherein specialised clusters are identified prior to general clusters.

8. A method according to claim 7, wherein specialised dusters are analysed for consideration as individual elements in general clusters.

9. A method of generating image data from scene data, wherein said scene data includes objects considered as elements;

an object has a surface that may be subdivided into a mesh, such that each component of said object is considered as an element; and a plurality of said objects may be grouped into a cluster of objects, also considered as an element; comprising the steps of identifying specialised clusters according to object characteristics;

identifying general dusters according to object proximity;

meshing object surfaces in response to a process of constructing a multi-resolution representation of the radiosity equation for said scene; and solving said radiosty equation.

10. A method according to claim 9, wherein said image data is rendered from a view determined in response to data from a virtual set.

11. Apparatus for constructing a multi-resolution representation of a radiosity equation for a scene, including storage means for storing instructions for processing means and data representing said scene; wherein said scene comprises object elements, and said instructions in said storage means are arranged to configure said processing means to perform steps of:

identifying specialised cluster elements by associating object elements having a characterising relationship; and linking and/or meshing elements in response to an estimate of error of light transmission between elements in which said linking includes calculating a form factor; and when linking a specialised cluster, said form factor is calculated with reference to said characterising relationship.

12. Apparatus according to claim 11, further configurable to perform the step of identifying generalised cluster elements by associating object elements in close proximity to each other; and when linking a cluster, a procedure for calculating said form factor is selected in response to said cluster type.

13. Apparatus according to claim 11, wherein elements in said specialised cluster have a characterising relationship characterised in that elements have a common characteristic that relates to light reflectance.

14. Apparatus according to claim 11, wherein said characterising relationship is that of near co-planarity.

15. Apparatus according to claim 11, wherein said characterising relationship is determined with reference to scene graph data.

16. Apparatus for constructing a multi-resolution representation of a radiosity equation for a scene, comprising storage means for storing instructions for processing means and data representing said scene; wherein said scene comprises object elements, and said instructions in said storage means are arranged to configure said processing means to perform steps of:

identifying specialised cluster elements by associating object elements having a characterising relationship;

identifying general cluster elements by associating object elements according to proximity; and linking and/or meshing elements in response to an estimate of error of light transmission between elements; wherein said linking includes calculating a form factor; and when linking a cluster, selecting a method of form factor calculation in response to the cluster type.

17. Apparatus according to claim 16, wherein specialised clusters are identified prior to general clusters.

18. Apparatus according to claim 17, wherein specialised clusters may be analysed for consideration as individual elements in general clusters.

19. Apparatus for generating image data from scene data, including processing means, and storage means for storing instructions for processing means and data representing said scene, wherein said scene includes objects considered as elements;

at least one of said object has a surface that may be subdivided into a mesh, each component of which being considered as an element; and a plurality of said objects may be grouped into a cluster of objects, also considered as an element; wherein said instructions configure said processing means to perform the steps of:

identifying specialised dusters according to object characteristics;

identifying general clusters according to object proximity meshing object surfaces in response to a process of constructing a multi-resolution representation of a radiosity equation for said scene; and solving said radiosity equation.

20. Apparatus according to claim 19, further including interface means, wherein said image data is rendered from a view determined in response to data, from a virtual set.

21. In a virtual set, in which real foreground images are combined with synthesised background images in real-time, means configured to generate said background image data, wherein a multi-resolution representation of a radiosity equation for a scene is constructed, including storage means for storing instructions for processing means and data representing said scene; wherein said scene comprises object elements, and said instructions in said storage means are arranged to configure said processing means to perform steps of;

identifying specialised cluster elements by associating object elements having a characteristic relationship; and linking and/or meshing elements in response to an estimate of error of light transmission between elements; in which said linking includes calculating a form factor; and when linking a specialised cluster, said form factor is calculated with reference to said characterising relationship.

22. Apparatus according to claim 21, further configurable to perform the step of identifying generalised cluster elements by associating object element in close proximity to each other; and when linking a cluster, a procedure for calculating said form factor is selected in response to said cluster type.

23. Apparatus according to claim 21, wherein elements in said specialised cluster have a characterising relationship characterised in that elements have a common characteristic that relates to light reflectance.

24. Apparatus according to claim 21, wherein said characterising relationship is that of near co-planarity.

25. Apparatus according to claim 21, wherein said characterising relationship to determined with reference to scene graph data.

26. A computer-readable medium having computer-readable instructions executable by a computer such that said computer peforms the steps of:

identifying specialised cluster elements by associating object elements having a characteristic relationship; and linking and/or meshing elements in response to an estimate of error of light transmission between said elements; wherein said linking includes calculating a form factor; and when linking a specialised cluster, said form factor is calculated with reference to said characterising relationship, thereby constructing a multi-resolution representation of a radiosity equation for a scene.

27. A computer-readable medium according to claim 26, wherein said instructions are executed by said computer so as to identify generalised cluster elements by associating object elements in close proximity to each other; and when linking a cluster, a procedure is preformed for calculating said form factor selected in response to said cluster type.

28. A computer-readable medium according to claim 26, wherein said instructions are executed by said computer such that said characterising relationship related to light reflectance.

29. A computer-readable medium according to claim 26, wherein said instructions are executed by said computer such that said characterising relationship is that of near co-planarity.

30. A computer-readable medium according to claim 26, wherein said instructions are executed by said computer such that said characterising relationship is determined with reference to scene graph data.

* * * * *

UNITED STATES PATENT AND TRADEMARK OFFICE
CERTIFICATE OF CORRECTION

PATENT NO.    : 6,411,297 B1
DATED         : June 25, 2002
INVENTOR(S)   : Filippo Tampieri It is certified that error appears in the above-identified patent and that said Letters Patent is hereby corrected as shown below:

Column 17,
Line 22, "identing" should read -- identifying --
Line 51, "radiosty" should read -- radiosity --

Column 18,
Line 52, "dusters" should read -- clusters --
Line 55, after "imity" insert -- ; --

Column 19,
Line 31, the first occurrence of "to" should read -- is --

Column 20,
Line 16, "preformed" should read -- performed --
Line 23, "related" should read -- relates --

Signed and Sealed this

Twenty-second Day of April, 2003

JAMES E. ROGAN
*Director of the United States Patent and Trademark Office*